US012606721B2

(12) United States Patent
Shimada et al.

(10) Patent No.: US 12,606,721 B2
(45) Date of Patent: Apr. 21, 2026

(54) FOAMING ADHESIVE SHEET AND METHOD FOR PRODUCING PRODUCT

(71) Applicant: DAI NIPPON PRINTING CO., LTD., Tokyo-to (JP)

(72) Inventors: Shinya Shimada, Tokyo-to (JP); Kentaro Hoshi, Tokyo-to (JP); Toshikazu Segawa, Tokyo-to (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 544 days.

(21) Appl. No.: 17/913,599

(22) PCT Filed: Mar. 25, 2021

(86) PCT No.: PCT/JP2021/012647
§ 371 (c)(1),
(2) Date: Sep. 22, 2022

(87) PCT Pub. No.: WO2021/193848
PCT Pub. Date: Sep. 30, 2021

(65) Prior Publication Data

US 2023/0146040 A1 May 11, 2023

(30) Foreign Application Priority Data

Mar. 25, 2020 (JP) ................................. 2020-054472

(51) Int. Cl.
*C09J 5/08* (2006.01)
*C09J 7/29* (2018.01)
(Continued)

(52) U.S. Cl.
CPC . *C09J 5/08* (2013.01); *C09J 7/29* (2018.01); *C09J 7/30* (2018.01); *C09J 7/50* (2018.01); *C09J 2301/312* (2020.08)

(58) Field of Classification Search
None
See application file for complete search history.

(56) References Cited

U.S. PATENT DOCUMENTS

2002/0089071 A1 7/2002 Sumita et al.
2010/0028588 A1* 2/2010 Kiuchi ....................... C09J 7/29 156/247

(Continued)

FOREIGN PATENT DOCUMENTS

JP 2002-146160 A 5/2002
JP 2005-307152 A 11/2005

(Continued)

OTHER PUBLICATIONS

English translation of Takayama et al. (JP 2018-058223). (Year: 2018).*

(Continued)

*Primary Examiner* — Ronak C Patel
(74) *Attorney, Agent, or Firm* — Oliff PLC

(57) ABSTRACT

A foaming adhesive sheet comprising a substrate and an adhesive layer placed on at least one surface side of the substrate; wherein the adhesive layer includes a curable adhesive, and a foaming agent; and a peeling force of a surface side where the adhesive layer is placed, measured by SAICAS (Surface And Interfacial Cutting Analysis System) method is 2.0 N or more.

12 Claims, 3 Drawing Sheets

(51) Int. Cl.
*C09J 7/30* (2018.01)
*C09J 7/50* (2018.01)

(56) References Cited

U.S. PATENT DOCUMENTS

| | | | | |
|---|---|---|---|---|
| 2016/0159993 | A1 | 6/2016 | Kamae et al. | |
| 2016/0340555 | A1* | 11/2016 | Ueki .................... | C09D 167/00 |
| 2018/0134926 | A1 | 5/2018 | Lei et al. | |
| 2020/0181458 | A1 | 6/2020 | Lei et al. | |
| 2020/0181459 | A1 | 6/2020 | Lei et al. | |
| 2022/0098458 | A1 | 3/2022 | Takahashi et al. | |

FOREIGN PATENT DOCUMENTS

| | | | |
|---|---|---|---|
| JP | 5184729 | B2 | 4/2013 |
| JP | 2016-199725 | A | 12/2016 |
| JP | 6067967 | B2 | 1/2017 |
| JP | 2018-21203 | A | 2/2018 |
| JP | 2018-65320 | A | 4/2018 |
| JP | 2018-158549 | A | 10/2018 |
| JP | 2019-203062 | A | 11/2019 |
| JP | 2019-204726 | A | 11/2019 |
| JP | 2019-214729 | A | 12/2019 |
| JP | 2020-125410 | A | 8/2020 |
| WO | 01/46290 | A1 | 6/2001 |
| WO | 2009/119467 | A1 | 10/2009 |
| WO | 2016/163514 | A1 | 10/2016 |
| WO | 2019/030914 | A1 | 2/2019 |
| WO | 2019/031429 | A1 | 2/2019 |
| WO | 2019/226819 | A1 | 11/2019 |

OTHER PUBLICATIONS

Jun. 22, 2021 International Search Report issued in International Patent Application No. PCT/JP2021/012647.

* cited by examiner

FOAMING ADHESIVE SHEET AND METHOD FOR PRODUCING PRODUCT

TECHNICAL FIELD

The present disclosure relates to a foaming adhesive sheet and a method for producing a product using the same.

BACKGROUND ART

An adhesive that adheres members to each other is used in various fields, and a lot of methods for adhering thereof has been known.

For example, Patent Documents 1 and 2 disclose an adhesive sheet including a foaming agent (foaming adhesive sheet). Patent Document 1 discloses an adhesive sheet comprising an expansive adhesive layer on bath surfaces or one surface of a substrate, the expansive adhesive layer including an epoxy resin containing a polyfunctional epoxy resin; a phenol resin as a curing agent; an imidazole based compound as a curing catalyst; and a temperature sensitive foaming agent, and at least one surface of the expansive adhesive layer is coated with a releasing agent. Also, Patent Document 2 discloses an adhesive sheet comprising a substrate; a thermally expansive adhesive layer provided on both surfaces of the substrate; an adhesive permeation layer provided on the surface of each adhesive layer wherein an adhesive is able of permeate therethrough when the adhesive is thermally expanded.

CITATION LIST

Patent Documents

Patent Document 1: WO2016/163514

Patent Document 2: Japanese Patent Application Laid-Open (JP-A) No. 2019-203062

SUMMARY OF DISCLOSURE

Technical Problem

As a method for using a forming adhesive sheet, for example, a method wherein members are adhered to each other by placing a foaming adhesive sheet between the members, and then, forming and curing the foaming adhesive sheet, has been known.

When a foaming adhesive sheet includes an adhesive layer on one surface or on both surfaces of a substrate, the adhesive layer may be lifted or peeled off from the substrate when the foaming adhesive sheet is bent, or in a working process such as cutting of the foaming adhesive sheet. Also, if a member has a burr, when inserting the foaming adhesive sheet into a gap of the member or into a gap between the members, or when placing a foaming adhesive sheet on one member and then inserting the other member into a gap, the adhesive layer may be lifted or peeled off from the substrate by the foaming adhesive sheet being stuck with the burr of the member. Therefore, for the foaming adhesive sheet, further improvement of the close adhesiveness of the adhesive layer with respect to the substrate has been desired.

However, in the foaming adhesive sheet, since a foaming agent is included in the adhesive layer, the adhesiveness of the adhesive layer tends to be decreased, compared to an adhesive layer not including a foaming agent. Also, in order to improve a handling property and a workability, the adhesive layer before foaming and curing is desirably non-pressure-sensitive adhesive (tack free). In such a case, the close adhesiveness of the adhesive layer tends to be decreased. Also, when the adhesive layer is foamed and cured by heating, for example, a heat resistant substrate is used, and many of such heat resistant substrates are usually low in close adhesiveness.

The present disclosure has been made in view of the above circumstances, and a main object thereof is to provide a foaming adhesive sheet wherein the close adhesiveness of the adhesive layer with respect to the substrate is excellent.

Solution to Problem

One embodiment of the present disclosure provides a foaming adhesive sheet comprising a substrate and an adhesive layer placed on at least one surface side of the substrate; wherein the adhesive layer includes a curable adhesive, and a foaming agent; and a peeling force of a surface side where the adhesive layer is placed, measured by SAICAS method is 2.0 N or more. Incidentally, Surface And Interfacial Cutting Analysis System is hereinafter abbreviated as SAICAS.

Another embodiment of the present disclosure provides a method for producing a product, the method comprising: a placing step of placing the foaming adhesive sheet described above between a first member and a second member; and an adhering step of adhering the first member and the second member by foaming and curing the foaming adhesive sheet.

Advantageous Effects of Disclosure

The foaming adhesive sheet in the present disclosure exhibits an effect that the close adhesiveness of the adhesive layer with respect to the substrate is excellent.

DESCRIPTION OF EMBODIMENTS

Figure 1:
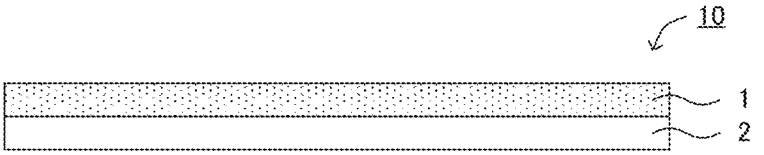
FIG. 1 is a schematic cross-sectional view illustrating an example of a foaming adhesive sheet in the present disclosure.

Embodiments in the present disclosure are hereinafter explained with reference to, for example, drawings. However, the present disclosure is enforceable in a variety of different forms, and thus should not be taken as is limited to the contents described in the embodiments exemplified as below. Also, the drawings may show the features of the present disclosure such as width, thickness, and shape of each part schematically comparing to the actual form in order to explain the present disclosure more clearly in some cases; however, it is merely an example, and thus does not limit the interpretation of the present disclosure. Also, in the present description and each drawing, for the factor same as that described in the figure already explained, the same reference sign is indicated and the detailed explanation thereof may be omitted.

In the present descriptions, in expressing an aspect wherein some member is placed on the other member, when described as merely "on" or "below", unless otherwise stated, it includes both of the following cases: a case wherein some member is placed directly on or directly below the other member so as to be in contact with the other member, and a case wherein some member is placed on the upper side or the lower side of the other member via yet another member. Also, in the present descriptions, on the occasion of expressing an aspect wherein some member is placed on the surface of the other member, when described as merely "on the surface side" or "on the surface", unless otherwise stated, it includes both of the following cases: a case wherein some member is placed directly on or directly below the other member so as to be in contact with the other member, and a case wherein some member is placed on the upper side or the lower side of the other member via yet another member.

Also, in the present descriptions, a member referred to as "film" is included in "sheet". Also, a member referred to as "sheet" is included in "film". Also, a number range in the present descriptions is a range of an average value.

The inventors of the present disclosure have carried out intensive studies about the close adhesiveness of an adhesive layer with respect to a substrate, in a foaming adhesive sheet including an adhesive layer on one surface or both surfaces of the substrate. For example, in relation to a close adhesiveness evaluation of an adhesive layer with respect to a substrate, Patent Document 1 discloses an evaluation of close adhesiveness by a L-shaped bending test wherein a foaming adhesive sheet is bent for one time by 90° into an L-shape. However, in the foaming adhesive sheet, as described above, since the demanded level for the close adhesiveness of an adhesive layer with respect to a substrate is high, it was found out that satisfying the close adhesiveness by the L-shaped bending test is not enough, and may not withstand practical use. As the results of further repeated studies, the inventors of the present disclosure have found out that, in order to obtain a foaming adhesive sheet capable of withstanding practical use, it is necessary to satisfy the close adhesiveness by a close adhesiveness test under more strict conditions than the L-shaped bending test, specifically, a close adhesiveness by a cross-shaped bending test wherein a foaming adhesive sheet is bent two times by 180° into a cross-shape, as will be described later. The inventors of the present disclosure have also found out that, by setting the peeling force of the adhesive layer side surface measured by SAICAS method to a predetermined value or more in a foaming adhesive sheet, not only the close adhesiveness by the L-shaped bending test but also the close adhesiveness by the cross-shaped bending test may be satisfied so that a foaming adhesive sheet capable of withstanding practical use may be obtained. The present disclosure is based on such knowledges.

A foaming adhesive sheet, and a method for producing a product using the same in the present disclosure will be hereinafter described in detail.

A. Foaming Adhesive Sheet

The foaming adhesive sheet in the present disclosure is a foaming adhesive sheet comprising a substrate and an adhesive layer placed on at least one surface side of the substrate; wherein the adhesive layer includes a curable adhesive, and a foaming agent; and a peeling force of a surface side where the adhesive layer is placed, measured by SAICAS method is 2.0 N or more.

Figure 2:
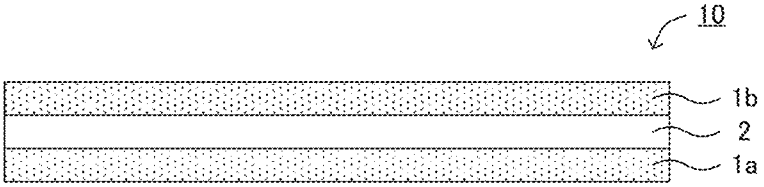
FIG. 2 is a schematic cross-sectional view illustrating another example of a foaming adhesive sheet in the present disclosure.

FIG. 1 and FIG. 2 are schematic cross-sectional views illustrating an example of a foaming adhesive sheet in the present disclosure. Foaming adhesive sheet 10 in FIG. 1 comprises substrate 2 and adhesive layer 1 placed on one surface side of the substrate 2. Foaming adhesive sheet 10 in FIG. 2 comprises substrate 2, first adhesive layer 1*a* placed on one surface side of the substrate 2, and second adhesive layer 1*b* placed on the other surface side of the substrate 2. The adhesive layer 1, first adhesive layer 1*a*, and second adhesive layer 1*b* include a curable adhesive and a foaming agent. The peeling force of a surface side where the adhesive layer 1 is placed, measured by SAICAS method of the foaming adhesive sheet 10 in FIG. 1 is a predetermined value or more. Also, the peeling force of a surface side where the first adhesive layer 1*a* is placed, and the peeling force of a surface side where the second adhesive layer 1*b* is placed, measured by SAICAS method of the foaming adhesive sheet 10 in FIG. 2 are a predetermined value or more. Incidentally, when the foaming adhesive sheet includes the adhesive layer on both surface sides, the peeling force of both surface sides are preferably a predetermined value or more. However, since the foaming adhesive sheet in the present disclosure may be used by paying attention to the bending direction and to the direction to which the surface faces, the peeling force of either one surface side may be a predetermined value or more.

In the foaming adhesive sheet in the present disclosure, since the peeling force of a surface side where the adhesive layer is placed, measured by SAICAS method is a predetermined value or more, the close adhesiveness of the adhesive layer with respect to the substrate in the foaming adhesive sheet is excellent. Specifically, in the foaming adhesive sheet in the present disclosure, not only the close adhesiveness by the L-shaped bending test but also the close adhesiveness by the cross-shaped bending test may be satisfied, as will be described later. Therefore, when the foaming adhesive sheet is placed between members, for example, lifting off or peeling off of the adhesive layer from the substrate may be suppressed even when the foaming adhesive sheet is bent. Also, when the foaming adhesive sheet is placed between members, for example, lifting off or peeling off of the adhesive layer from the substrate may be suppressed even when the member has a burr. Therefore, a foaming adhesive sheet capable of withstanding practical use may be provided.

Each constitution of a foaming adhesive sheet in the present disclosure is hereinafter described.

1. Properties of Foaming Adhesive Sheet

In the foaming adhesive sheet in the present disclosure, the peeling force of a surface side where the adhesive layer is placed, measured by SAICAS method is 2.0 N or more, may be 3.0 N or more, may be 3.5 N or more, and may be 4.0 N or more. Also, the peeling force of the surface side of the foaming adhesive sheet where the adhesive layer is placed is, for example, 6.0 N or less, may be 5.5 N or less, and may be 5.0 N or less. By the peeling force of the surface side of the foaming adhesive sheet where the adhesive layer is placed being in the range described above, the close adhesiveness of the adhesive layer with respect to the substrate is excellent in the foaming adhesive sheet. Also, although the close adhesiveness of an adhesive layer with respect to a substrate is preferably high as possible, cutting and processing of the material of the adhesive layer wherein the peeling force, of the surface side of the foaming adhesive sheet where the adhesive layer is placed, is high tends to be difficult.

Incidentally, as described above, when the adhesive layer is placed on both surface sides of the substrate, the peeling force of either one surface side of the foaming adhesive sheet may be in the range described above, the peeling force of both surface sides of the foaming adhesive sheet is preferably in the range described above.

The peeling force of the surface side of the foaming adhesive sheet where the adhesive layer is placed may be measured according to SAICAS method. The SAICAS method is also referred to as a surface-interface cutting method. To measure the peeling force of the surface side of the foaming adhesive sheet where the adhesive layer is placed by the SAICAS method, firstly, the adhesive layer side surface of the foaming adhesive sheet is cut by contacting a cutting knife to the surface, and moving the cutting knife relatively to the foaming adhesive sheet in the horizontal direction and the perpendicular at the same time at a constant speed. That is, the adhesive layer is cut obliquely by the cutting knife. Then, when the cutting knife reaches to a predetermined depth of the thickness of the adhesive layer or more from the adhesive layer side surface of the foaming adhesive sheet, the force applied to the cutting knife changes greatly, and the horizontal force applied to the cutting knife decreases. At this point, the cutting is carried out by moving the cutting knife relative to the foaming adhesive sheet only in the horizontal direction. The horizontal force applied to the cutting knife, when the cutting is carried out by moving the cutting knife relative to the foaming adhesive sheet only in the horizontal direction, corresponds to the peeling force of the surface side of the foaming adhesive sheet where the adhesive layer is placed. In the present disclosure, this peeling force is set to 2.0 N or more.

Incidentally, in the foaming adhesive sheet in the present disclosure, for example, there are cases where the adhesive layer is directly placed on the substrate, and where an intermediate layer is placed between the substrate and the adhesive layer as described later. In either case, the cutting is carried out by moving the cutting knife relatively to the foaming adhesive sheet in the horizontal direction and the perpendicular at the same time at a constant speed, and then, when the force applied to the cutting knife changes greatly for the first time, and when the horizontal force applied to the cutting knife decreases, the cutting knife is moved relative to the foaming adhesive sheet only in the horizontal direction. In this case, the interface when the cutting is carried out by moving the cutting knife relative to the foaming adhesive sheet only in the horizontal direction, is an interface of the adhesive layer and the layer adjacent to the adhesive layer, or an interface located between the adhesive layer and the substrate, and the interface is likely to be a peeling interface.

The details of the method for measuring a peeling force of the surface side of the foaming adhesive sheet where the adhesive layer is placed, by the SAICAS method will be described in the section of Examples later.

In the present disclosure, the peeling force of the surface side of the foaming adhesive sheet where the adhesive layer is placed, measured by the SAICAS method may be adjusted to a predetermined value or more by, for example, placing an intermediate layer between the substrate and adhesive layer; subjecting the surface of the substrate where the adhesive layer is placed, to a surface treatment; adjusting the composition of the adhesive layer; adjusting the average thickness of the adhesive layer; or adjusting the combination of the material of the substrate, the intermediate layer, and the adhesive layer.

As will be described later, the peeling force may be improved by improving the close adhesiveness of the adhesive layer with respect to the substrate by, for example, placing an intermediate layer between the substrate and adhesive layer; and subjecting the surface of the substrate where the adhesive layer is placed, to a surface treatment.

Also, when adjusting the composition of the adhesive layer, for example in the adhesive layer including an epoxy resin and a curing agent, by including a polymerizable component having a flexible structure, the flexibility and the toughness of the adhesive layer may be improved, the close adhesiveness of the adhesive layer with respect to the substrate may be improved, and the peeling force may be improved. As will be described later, specific examples of the polymerizable component having a flexible structure may include an acrylic resin compatible with an epoxy resin. Also, for example in the adhesive layer including an epoxy resin and a curing agent, the toughness of the adhesive layer may be suppressed from decreasing by not including a component that decreases the toughness, so that the close adhesiveness of the adhesive layer with respect to the substrate may be improved, thereby improving the peeling force. Specific examples of the component that deceases the toughness may include a phenol resin, as will be described later. Also, by increasing the molecular weight of the component included in the adhesive layer, the viscosity and the agglomerating property of the adhesive layer may be improved so that the close adhesiveness of the adhesive layer with respect to the substrate may be improved, thereby improving the peeling force. Specific approach may include, in the adhesive layer including an epoxy resin and a curing agent, increasing the molecular weight of at least either one of the epoxy resin and the curing agent; or in the adhesive layer including an epoxy resin, an acrylic resin, and a curing agent, increasing the molecular weight of at least one of the epoxy resin, the acrylic resin, and the curing agent.

Also, when adjusting the average thickness of the adhesive layer, for example, as will be described later, by increasing the average thickness of the adhesive layer, the close adhesiveness of the adhesive layer with respect to the substrate may be improved, thereby improving the peeling force.

Also, when adjusting the combination of the material of the substrate, the intermediate layer, and the adhesive layer, as will be described later, when the substrate includes polyphenylene sulfide or polyethylene, the intermediate layer includes a cross-linked polyester resin, and the adhesive layer includes an epoxy resin and a curing agent, the close adhesiveness of the adhesive layer with respect to the substrate tends to be high, so that the peeling force may be improved.

In the foaming adhesive sheet in the present disclosure, the adhesive layer is practically preferably non-pressure-sensitive adhesive (tack free). In this case, the adhesive layer is preferably placed on the outermost surface. By the adhesive layer being practically non-pressure-sensitive adhesive (tack free), the foaming adhesive sheet may have excellent sliding property and blocking resistance. Therefore, the handling property and workability of the foaming adhesive sheet may be improved. Specifically, when members are adhered to each other by placing the foaming adhesive sheet between the members, the foaming adhesive sheet may be inserted smoothly into a gap of the member or into a gap between the members, and when a foaming adhesive sheet is placed on one member and then inserting the other member into a gap, the other member may be inserted into the gap smoothly.

Here, the non-pressure-sensitive adhesive is generally used mainly to mean low pressure-sensitive adhesive force. In the present disclosure, being "non-pressure-sensitive adhesive" is referred to a condition that a rolled up foaming adhesive sheet may be easily unrolled without reluctance.

Also, "pressure-sensitive adhesion" is a concept included in "adhesion". The pressure-sensitive adhesion is used as a meaning of a temporary adhesion phenomenon, whereas the adhesion is distinguished in some cases from a viewpoint that it is used as a meaning of a practically permanent adhesion phenomenon (Physical and Chemical Science Dictionary Fifth Edition, published by Iwanami Shoten). "Pressure-sensitive adhesiveness" and "pressure-sensitive adhesive force" indicate a property to adhere by pressure sensing and the adhesive force at that time.

Incidentally, "the pressure-sensitive adhesiveness of an adhesive layer" and "the pressure-sensitive adhesive force of an adhesive layer" in the present descriptions indicate the pressure-sensitive adhesiveness and the pressure-sensitive adhesive force exhibited by the adhesive layer before foaming and curing, unless the circumstances are exceptional. Also, "the adhesiveness of an adhesive layer" and "the adhesive force of an adhesive layer" in the present descriptions indicate the adhesiveness and the adhesive force exhibited by the adhesive layer after foamed and cured, unless the circumstances are exceptional.

Specifically, when the adhesive layer is practically non-pressure-sensitive adhesive, the pressure-sensitive adhesive force of the adhesive layer is preferably 0 N/25 mm or more and 0.1 N/25 mm or less, may be 0.05 N/25 mm or less, and may be 0.02 N/25 mm or less. By the pressure-sensitive adhesive force of the adhesive layer being in the range described above, the adhesive layer may be practically non-pressure-sensitive adhesive, and the foaming adhesive sheet may have excellent sliding property and blocking resistance.

For example, Patent Documents 1 discloses to provide a releasing agent layer on the surface of an expansive adhesive layer. However, when the releasing agent layer is provided on the surface of the adhesive layer, the adhesiveness of the adhesive layer after foamed and cured may be decreased. In contrast to this, in the foaming adhesive sheet wherein the adhesive layer is practically non-pressure-sensitive adhesive, there is no need to place a releasing layer or a releasing sheet in order to apply the blocking resistance and the sliding property so that the adhesive layer may be placed on the outermost surface. Therefore, a foaming adhesive sheet having excellent adhesiveness after foamed and cured may be obtained.

When the adhesive layer is placed on both surface sides of the substrate, the pressure-sensitive adhesive force of at least one adhesive layer may be in the range described above. When members are adhered to each other by placing the foaming adhesive sheet between the members, for example, the foaming adhesive sheet is placed on one member at first, and then, the other member is inserted into the gap after the foaming adhesive sheet is placed on one member. In this case, the foaming adhesive sheet surface of the side to be in contact with the other member may have good sliding property, when the foaming adhesive sheet is placed on one member, and then, the other member is inserted to the gap after the foaming adhesive sheet is placed on one member. Therefore, the pressure-sensitive adhesive force of at least one adhesive layer may be in the range described above.

when the adhesive layer is placed on both surfaces of the substrate, for example, the pressure-sensitive adhesive force of either one of the adhesive layer may be in the range described above, and the pressure-sensitive adhesive force of the both adhesive layers may be in the range described above. Among the above, the pressure-sensitive adhesive force of the both adhesive layers are preferably in the range described above.

The pressure-sensitive adhesive force of the adhesive layer may be measured according to JIS Z 0237: 2009 (testing method for a pressure-sensitive adhesive tape and pressure-sensitive adhesive sheet) and testing method of a pressure-sensitive adhesive force 1 (temperature of 23° C., humidity of 50%, a test method wherein a tape and a sheet is peeled off by 180° with respect to a stainless test plate) prepared based on ISO 29862. Incidentally, the details of the method for measuring a pressure-sensitive adhesive force of an adhesive layer will be described in the section of Examples later.

In the present disclosure, the pressure-sensitive adhesive force of the adhesive layer may be adjusted to a predetermined value or more by, for example, adjusting the composition of the adhesive layer. Specifically, in the adhesive layer including an epoxy resin and a curing agent, the pressure-sensitive adhesiveness of the adhesive layer may be decreased by using an epoxy resin that is a solid at ordinary temperature, and by using a curing agent that is a solid at ordinary temperature. Also, in the adhesive layer including an epoxy resin and a curing agent, the pressure-sensitive adhesiveness of the adhesive layer may be decreased by including an epoxy resin with high softening temperature, or by including an epoxy resin with high weight average molecular weight. For example, the pressure-sensitive adhesiveness of the adhesive layer may be decreased by including a plurality kinds of epoxy resins differing in the softening temperature in the adhesive layer, that is, in a case where the adhesive layer includes one epoxy resin, by further including another epoxy resin whose softening temperature is 25° C. or more and higher by 10° C. or more than the softening temperature of said one epoxy resin. Also, for example, the pressure-sensitive adhesiveness of the adhesive layer may be decreased by including a plurality kinds of epoxy resins differing in the weight average molecular weight in the adhesive layer, that is, in a case where the adhesive layer includes one epoxy resin, by further including another epoxy resin whose weight average molecular weight is 370 or more and higher by 300 or more than the weight average molecular weight of said one epoxy resin. More specifically, as will be described later, in the adhesive layer including an epoxy resin and a curing agent, the pressure-sensitive adhesiveness of the adhesive layer may be decreased by including, as the epoxy resin, a first epoxy resin with low softening temperature and low molecular weight, and a second epoxy resin with high softening temperature and high molecular weight. Also, as will be described later, in the adhesive layer including an epoxy resin and a curing agent, the pressure-sensitive adhesiveness of the adhesive layer may be decreased by including an acrylic resin compatible with the epoxy resin.

In the foaming adhesive sheet in the present disclosure, the pencil hardness of the adhesive layer side surface may be, for example, HB or more, and may be F or more. When the pencil hardness of the adhesive layer side surface of the foaming adhesive sheet in the present disclosure is F or more, the sliding property and the inserting property may further be improved. Specifically, when the pencil harness of the adhesive layer side surface of the foaming adhesive sheet is in the range described above, the friction resistance tends to be low, so that the sliding property may be improved. Also, when inserting the foaming adhesive sheet into a gap of the member or into a gap between the members, or when placing a foaming adhesive sheet on one member and then inserting the other member into a gap, by the pencil hardness being in the range described above, the end surface of the member may be suppressed from digging into the adhesive layer, specifically, when the end surface of the member has a burr, the adhesive layer is suppressed from being stuck with the burr of the end surface of the member so that inserting property may be improved. Therefore, when members are adhered to each other by placing the foaming adhesive sheet between the members, for example, the foaming adhesive sheet may be inserted smoothly into a gap of the member or into a gap between the members, and when a foaming adhesive sheet is placed on one member and then inserting the other member into a gap, the other member may be inserted smoothly. Also, by the pencil hardness being in the range described above, when the foaming adhesive sheet is placed between the members, the adhesive layer side surface of the foaming adhesive sheet is suppressed from being worn. Also, the pencil hardness may be, for example, 2H or less. When the pencil hardness is too high, the close adhesiveness of the adhesive layer with respect to the substrate may be decreased in some cases.

When the adhesive layer is placed on both surfaces of the substrate, the pencil hardness of at least one of the surfaces, among the both surfaces of the foaming adhesive sheet, may be in the range described above, for example, the pencil hardness of either one of the surfaces may be in the range described above, and the pencil hardness of the both surfaces may be in the range described above. Among them, the pencil hardness of the both surfaces of the foaming adhesive sheet are preferably in the range described above.

The pencil hardness may be determined according to JIS K5600 corresponding to ISO 15184. Incidentally, the details of the method for measuring a pencil hardness will be described in the section of Examples later.

The pencil hardness of the adhesive layer side surface of the foaming adhesive sheet in the present disclosure may be controlled by, for example, the composition and the like of the adhesive layer. Specifically, the pencil hardness may be controlled by, for example, the average particle size or the content of the foaming agent included in the adhesive layer. More specifically, the pencil hardness may be increased by increasing the average particle size of the foaming agent. Also, the pencil hardness may be increased by increasing the content of the foaming agent. Also, for example, the pencil hardness may be increased by including an inorganic filler in the adhesive layer. Also, for example, the pencil hardness may be increased by including a component having a rigid structure in the adhesive layer. Specifically, in the adhesive layer including an epoxy resin and a curing agent, examples of the component having a rigid structure may include a phenol resin.

In the foaming adhesive sheet in the present disclosure, the static friction coefficient of the adhesive layer side surface may be, for example, 0.34 or less, may be 0.30 or less, and may be 0.26 or less. Also, the static friction coefficient may be, for example, 0.16 or more. When the static friction coefficient of the adhesive layer side surface of the foaming adhesive sheet in the present disclosure is 0.30 or less, the sliding property and the inserting property may further be improved. Therefore, for example, when members are adhered to each other by placing the foaming adhesive sheet between the members, the foaming adhesive sheet may be inserted smoothly into a gap of the member or into a gap between the members, and when a foaming adhesive sheet is placed on one member and then inserting the other member into a gap, the other member may be inserted smoothly.

When the adhesive layer is placed on both surfaces of the substrate, the static friction coefficient of at least one of the surfaces, among the both surfaces of the foaming adhesive sheet, may be in the range described above. For example, the static friction coefficient of either one of the surface may be in the range described above, and the static friction coefficient of the both surfaces may be in the range described above. Among them, the static friction coefficient of the both surfaces of the foaming adhesive sheet are preferably in the range described above.

The static friction coefficient may be determined according to JIS K7125 corresponding to ISO 8295. Incidentally, the details of the method for measuring a static friction coefficient will be described in the section of Examples later.

The static friction coefficient of the adhesive layer side surface of the foaming adhesive sheet in the present disclosure may be controlled, for example, by adjusting the composition of the adhesive layer, or by adjusting the pencil hardness of the adhesive layer side surface of the foaming adhesive sheet. Specifically, the static friction coefficient may be controlled by, for example, the average particle size or the content of the foaming agent included in the adhesive layer. More specifically, the static friction coefficient tends to be decreased when the average particle size of the foaming agent is increased. Also, the static friction coefficient tends to be decreased when the content of the foaming agent is increased. Also, the static friction coefficient tends to be decreased when the pencil hardness of the adhesive layer side surface of the foaming adhesive sheet is increased.

It is preferable that the foaming adhesive sheet in the present disclosure has good shape retainability. The bending moment based on JIS P8125 corresponding to ISO 2493 is, for example, 3 gf·cm or more, and may be 5 gf·cm or more. Meanwhile, the bending moment is, for example, less than 40 gf·cm, and may be less than 30 gf·cm. Conventionally, in the foaming adhesive sheet, it has been a commonly used approach to improve the shape retainability and the inserting property into a narrow gap by increasing the bending moment. In contrast to this, the inventors of the present disclosure have found out that, considering other properties, the bending moment is preferably in the range described above, since the shape retainability may be secured by contriving the shape, and since other problem may be arose when the bending moment is high. When the bending moment is lower than the range described above, the retaining of the shape may be difficult even by a contriving such as a folding back. Also, when the bending moment is larger than the range described above, since the shape is reversed after a folding process, a heating is necessary during the folding process, or a folding line is needed to be rucked. The sheet life duration may be deteriorated when it is heated, and the insulation property of the rucked portion may be deteriorated. In addition, in the foaming adhesive sheet in the present disclosure, the surface is not damaged even when it is inserted rapidly, by increasing the surface hardness.

It is preferable that the foaming adhesive sheet in the present disclosure has high adhesiveness after foamed and cured. The shear strength (adhesive strength) based on JIS K6850 corresponding to ISO 4587 may be, for example, 2.10 MPa or more, may be 2.40 MPa or more, and may be 3.0 MPa or more at 23° C. Also, the shear strength (adhesive strength) may be, for example, 0.27 MPa or more, may be 0.55 MPa or more, and may be 0.58 MPa or more at 200° C. For example, in a high-strength acrylic foam pressure-sensitive adhesive tape not necessary to be heated, the shear strength (adhesive strength) is approximately 1 MPa or more and 2 MPa or less at ordinary temperature, and is not resistant to 200° C. Therefore, when the shear strength (adhesive strength) at 23° C. is in the range described above, it is superior in the strength. Also, when the shear strength (adhesive strength) at 200° C. is in the range described above, it may be employed to the use application such as those used in the vicinity of an engine of a vehicle, and those requiring the heat resistance equivalent thereto.

It is preferable that the foaming adhesive sheet in the present disclosure has high electrical insulation after foamed and cured. The dielectric breakdown voltage based on JIS C2107 corresponding to IEC 60454-2 is preferably, for example, 3 kV or more, and more preferably 5 kV or more. By the dielectric breakdown voltage being in the range described above, it may be applied to an anticorrosion application or to copper wiring surroundings. Also, the foaming adhesive sheet after foamed and cured preferably has a thermal conductivity of, for example, 0.1 W/mK or more, and more preferably 0.15 W/mK or more. By the thermal conductivity being in the range described above, the parts may be decreased in size, and the curing reaction during the heating may be proceeded.

2. Adhesive Layer

The adhesive layer in the present disclosure is placed on at least one surface side of a substrate, and includes a curable adhesive and a foaming agent.

(1) Material of Adhesive Layer (a) Curable Adhesive

As the curable adhesive included in the adhesive layer in the present disclosure, a curable adhesive commonly used for an adhesive layer of a foaming adhesive sheet may be used. Examples of the curable adhesive may include a thermosetting adhesive and a photo curing adhesive. Among them, the thermosetting adhesive is preferable. The thermosetting adhesive may be applied even when the member is not transparent, as in a case of a metal member.

The curable adhesive is preferably an epoxy resin based adhesive. That is, the curable adhesive preferably includes an epoxy resin and a curing agent. The cured film of the epoxy resin based adhesive is usually hard and tough, and it is suitable for adhering members of a hard material such as a metal member and a glass member. Since a burr easily occurs in a processing of a metal member, when inserting the foaming adhesive sheet into a gap of the member or into a gap between the members, or when placing a foaming adhesive sheet on one member and then inserting the other member into a gap, there is a concern that the adhesive layer may be lifted or peeled off from the substrate by the foaming adhesive sheet being stuck with the burr of the metal member. In contrast to this, since the close adhesiveness of the adhesive layer with respect to the substrate is excellent in the present disclosure, the occurrence of the lifting off or peeling off of the adhesive layer from the substrate as described above may be suppressed. Therefore, the present disclosure is useful when the epoxy resin based adhesive is used. Also, the epoxy resin based adhesive is usually excellent in heat resistance, insulating property and chemical resistance, curing shrinkage is small, so that it may be used in a wide variety of applications.

Also, when the curable adhesive is the epoxy resin based adhesive, the curable adhesive preferably further includes an acrylic resin compatible with an epoxy resin. By further using the acrylic resin compatible with an epoxy resin, the toughness of the adhesive layer may be improved so that the close adhesiveness of the adhesive layer with respect to the substrate may be improved.

(i) Epoxy Resin

The epoxy resin in the present disclosure is a compound including at least one or more epoxy group or glycidyl group, and cured by causing a cross-linking polymerization reaction by being used in combination with a curing agent. The epoxy resin also includes a monomer including at least one or more epoxy group or glycidyl group.

An epoxy resin generally used for an adhesive layer of a foaming adhesive sheet may be sued as the epoxy resin. Among them, as the epoxy resin, the curable adhesive preferably includes a first epoxy resin with a softening temperature of 50° C. or more and an epoxy equivalent of 5000 g/eq or less, and a second epoxy resin with a softening temperature higher than the first epoxy resin and a weight-average molecular weight of 20,000 or more. By using the first epoxy resin and the second epoxy resin in combination, a foaming adhesive sheet having excellent blocking resistance and excellent adhesiveness after foamed and cured, may be obtained. Further, the pressure-sensitive adhesiveness (tack property) of the adhesive layer may be decreased so that a foaming adhesive sheet having excellent sliding property may be obtained.

When attempting only an improvement in adhesiveness after foamed and cured, for example, it is effective to use an epoxy resin with a lower molecular weight (low epoxy equivalent) than an epoxy resin with a high molecular weight (high epoxy equivalent). However, when the epoxy resin with a lower molecular weight (low epoxy equivalent) is used, the epoxy resins with a lower molecular weight (low epoxy equivalent) are assimilated with each other when, for example, the foaming adhesive sheet is rolled up into a roll, and the blocking easily occurs.

In contrast to this, if a first epoxy resin with a relatively low softening temperature (relatively high crystallinity) and a low molecular weight (low epoxy equivalent) is used, when the temperature is higher than the softening temperature, the first epoxy resin is rapidly melted and turned into a liquid with a low viscosity. Therefore, it is easy to improve the adhesiveness after foamed and cured. Meanwhile, since the first epoxy resin is relatively high in crystallinity, the blocking may be suppressed from occurring, compared to an epoxy resin with relatively low crystallinity or an epoxy resin with no crystallinity. However, when only the first epoxy resin is used, there is a possibility that the blocking suppressing effect is not sufficient, or that the pressure-sensitive adhesiveness (tack property) of the adhesive layer is too high. Therefore, a second epoxy resin with relatively high softening temperature (with relatively low crystallinity) and high molecular weight is further used. Thereby, the blocking suppressing effect may be improved, and the pressure-sensitive adhesiveness (tack property) of the adhesive layer may be kept low.

(i-1) First Epoxy Resin

The first epoxy resin has a softening temperature of 50° C. or more, and an epoxy equivalent of 5000 g/eq or less. The first epoxy resin has a relatively low softening temperature (relatively high crystallinity) as compared with the second epoxy resin to be described later. Since the first epoxy resin has relatively high crystallinity and low molecular weight, it is easy to improve the adhesiveness after foamed and cured and the blocking resistance. Also, since the first epoxy resin has a low molecular weight, a cross-linking density may be increased so that an adhesive layer having good mechanical strength, chemical resistance, and curability may be obtained. Also, it is preferable that the first epoxy resin is a solid epoxy resin at ordinary temperature (23° C.).

The softening temperature of the first epoxy resin is usually 50° C. or more, may be 55° C. or more, and may be 60° C. or more. Meanwhile, the softening temperature of the first epoxy resin is, for example, 150° C. or less. The softening temperature may be measured by a ring and ball method according to JIS K7234.

The epoxy equivalent of the first epoxy resin is, for example, 5000 g/eq or less, may be 3000 g/eq or less, may be 1000 g/eq or less, and may be 600 g/eq or less. Meanwhile, the epoxy equivalent of the first epoxy resin is, for example, 90 g/eq or more, may be 100 g/eq or more, and may be 110 g/eq or more. The epoxy equivalent may be measured by a method according to JIS K7236 corresponding to ISO 3001 (Plastics-Epoxy compounds-Determination of epoxy equivalent), and is a number of grams of a resin including an epoxy group of 1 gram equivalent.

The first epoxy resin may be a monofunctional epoxy resin, may be a bifunctional epoxy resin, may be a trifunctional epoxy resin, and may be an epoxy resin of a tetra-functional or more.

Also, the weight-average molecular weight (Mw) of the first epoxy resin is usually lower than the weight-average molecular weight (Mw) of the second epoxy resin to be described later. Mw of the first epoxy resin is, for example 6,000 or less, may be 4,000 or less, and may be 3,000 or less. Meanwhile, Mw of first epoxy resin is, for example, 400 or more. Mw is a value in terms of polystyrene when measured with a gel permeation chromatography (GPC).

The melt viscosity at 150° C. of the first epoxy resin is, for example, 0.005 Pa·s or more, may be 0.015 Pa·s or more, may be 0.03 Pa·s or more, may be 0.05 Pa·s or more, and may be 0.1 Pa·s or more. When the melt viscosity is too low, preferable foaming property may not be obtained. Also, when the melt viscosity of the first epoxy resin is too low (when the crystallinity of the first epoxy resin is too high), the pressure-sensitive adhesiveness (tack property) of the adhesive layer to be obtained may be high. The reason therefor is presumed that, when the melt viscosity of the first epoxy resin is too low (when the crystallinity of first epoxy resin is too high), the crystallinity thereof greatly decreases when it is compatibilized with the second epoxy resin or the acrylic resin so that Tg of the adhesive composition as a whole is decreased. Meanwhile, the melt viscosity at 150° C. of the first epoxy resin is, for example, 10 Pa·s or less, may be 5 Pa·s or less, and may be 2 Pa·s or less. When the melt viscosity is too high, the uniformity of the adhesive layer to be obtained may be decreased. The melt viscosity may be determined by measuring with a Brookfield type single cylinder rotary viscosimeter and a thermocell for heating a solution, according to JIS K6862 corresponding to ISO 2555 (Resins in the liquid state or as emulsions or dispersions-Determination of Brookfield RV viscosity).

Next, a configuration of the first epoxy resin will be described. Examples of the first epoxy resin may include an aromatic epoxy resin, an aliphatic epoxy resin, an alicyclic epoxy resin, and a heterocyclic epoxy resin. Specific examples of the first epoxy resin may include bisphenol type epoxy resins such as a bisphenol A type epoxy resin and a bisphenol F type epoxy resin; novolac type epoxy resins such as a bisphenol A novolac type epoxy resin and a cresol novolac type epoxy resin; and modified epoxy resins such as a urethane modified epoxy resin and a rubber modified epoxy resin. Further, other specific example may include a biphenyl type epoxy resin, a stilbene type epoxy resin, a triphenol methane type epoxy resin, an alkyl-modified triphenol methane type epoxy resin, a triazine nucleuscontain epoxy resin, a dicyclopentadiene-modified phenol type epoxy resin, a naphthalene type epoxy resin, a glycol type epoxy resin, and a pentaerythritol type epoxy resin. The first epoxy resin may be one kind, and may be two kinds or more.

The bisphenol A type epoxy resin may be present in a liquid state at ordinary temperature or in a solid state at ordinary temperature according to the number of repeating units of the bisphenol skeleton. The bisphenol A type epoxy resin wherein the bisphenol skeleton of the main chain is, for example, 2 or more and 10 or less is solid at ordinary temperature. In particular, the bisphenol A type epoxy resin is preferable in that heat resistance may be improved.

Particularly, the first epoxy resin is preferably a bisphenol A novolac type epoxy resin represented by the following general formula (1).

[Chemical formula 1]

General formula (1)

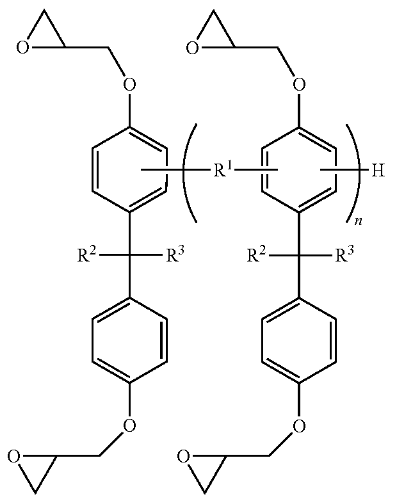

In general formula (1), $R^1$ is a group represented by $C_mH_{2m}$ ("m" is 1 or more and 3 or less), $R^2$ and $R^3$ are respectively and independently a group represented by $C_pH_{2p+1}$ ("p" is 1 or more and 3 or less), and "n" is 0 or more and 10 or less.

In general formula (1), "m" in R is preferably 1, that is, $R^1$ is preferably —$CH_2$—. Similarly, "p" in $R^2$ and $R^3$ is preferably 1, that is, $R^2$ and $R^3$ are preferably —$CH_3$. Also, the hydrogen that bonds to the benzene ring in general formula (1) may be substituted with another element or another group.

The content of the first epoxy resin when the resin component included in the adhesive layer is regarded as 100 mass parts is, for example, 1 mass part or more, may be 3 mass parts or more, may be 5 mass parts or more, may be 10 mass parts or more, may be 15 mass parts or more, and may be 25 mass parts or more. When the content of the first epoxy resin is too low, the adhesiveness after foamed and cured and the blocking resistance may be deteriorated. Meanwhile, the content of the first epoxy resin when the resin component included in the adhesive layer is regarded as 100 mass parts is, for example, 90 mass parts or less, may be 80 mass parts or less, may be 70 mass parts or less, may be 60 mass parts or less, may be 50 mass parts or less, and may be 40 mass parts or less. When the content of the first epoxy resin is too high, the content of the second epoxy resin and the acrylic resin will be relatively low so that the close adhesiveness of the adhesive layer with respect to the substrate, the blocking resistance, and the adhesiveness after foamed and cured may not be balanced.

(i-2) Second Epoxy Resin

The softening temperature of the second epoxy resin is higher than the first epoxy resin and the weight-average molecular weight is 20,000 or more. The second epoxy resin has relatively high softening temperature (relatively low crystallinity), compared to the above described first epoxy resin. Since the second epoxy resin has relatively low crystallinity and has high molecular weight, the blocking resistance is easily improved. Further, since the second epoxy resin has relatively low crystallinity and has high molecular weight, the increase of the pressure-sensitive adhesiveness (tack property) due to the first epoxy resin may be suppressed. Also, the second epoxy resin is preferably a solid epoxy resin at ordinary temperature (23° C.).

The weight-average molecular weight (Mw) of the second epoxy resin is usually higher than the weight-average molecular weight (Mw) of the first epoxy resin. Mw of the second epoxy resin is usually, 20,000 or more, may be 30,000 or more, and may be 35,000 or more. Meanwhile, Mw of the second epoxy resin is, for example, 100,000 or less.

The epoxy equivalent of the second epoxy resin may be higher than, less than, or equal to the epoxy equivalent of the first epoxy resin. The epoxy equivalent of the second epoxy resin is, for example, 4000 g/eq or more, may be 5000 g/eq or more, and may be 6000 g/eq or more. Meanwhile, the epoxy equivalent of the second epoxy resin is, for example, 20000 g/eq or less.

The second epoxy resin may be a monofunctional epoxy resin, may be a bifunctional epoxy resin, may be a trifunctional epoxy resin, and may be an epoxy resin of a tetra-functional or more.

The softening temperature of the second epoxy resin is usually higher than the softening temperature of the first epoxy resin. The difference between the two is, for example, 10° C. or more, may be 20° C. or more, and may be 30° C. or more. The softening temperature of the second epoxy resin is, for example, 80° C. or more, and may be 90° C. or more. Meanwhile, the softening temperature of the second epoxy resin is, for example, 180° C. or less.

The configuration of the second epoxy resin is similar to that of the above describe first epoxy resin; thus, the description herein is omitted.

The content of the second epoxy resin when the resin component included in the adhesive layer is regarded as 100 mass parts is, for example, 10 mass parts or more, may be 15 mass parts or more, may be 20 mass parts or more, may be 25 mass parts or more, may be 30 mass parts or more, may be 35 mass parts or more, may be 40 mass parts or more, and may be 45 mass parts or more. When the content of the second epoxy resin is too low, the blocking resistance may be deteriorated. Meanwhile, the content of the second epoxy resin when the resin component included in the adhesive layer is regarded as 100 mass parts is, for example, 90 mass parts or less, may be 85 mass parts or less, may be 80 mass parts or less, and may be 75 mass parts or less. When the content of the second epoxy resin is too high, the content of the first epoxy resin and the acrylic resin will be relatively low so that the close adhesiveness of the adhesive layer with respect to the substrate, the blocking resistance, and the adhesiveness after foamed and cured may not be balanced.

The proportion of the first epoxy resin with respect to the total of the first epoxy resin and the second epoxy resin is, for example, 5 mass % or more, may be 10 mass % or more, may be 15 mass % or more, and may be 20 mass % or more. Meanwhile, the proportion of the first epoxy resin is, for example, 80 mass % or less, may be 75 mass % or less, and may be 60 mass % or less.

Also, the proportion of the total of the first epoxy resin and the second epoxy resin with respect to all the epoxy resins included in the adhesive layer is, for example, 50 mass % or more, may be 70 mass % or more, may be 90 mass % or more, and may be 100 mass %.

(ii) Acrylic Resin

The acrylic resin in the present disclosure is a resin compatibilized with the epoxy resin. Since the acrylic resin is compatible with the epoxy resin, the toughness of the adhesive layer is likely to be improved. As the result, the close adhesiveness of the adhesive layer with respect to the substrate may be improved. Also, by improving the toughness of the adhesive layer, the adhesiveness after foamed and cured may be improved. Further, the acrylic resin is believed to function as a compatibilizing agent of the foaming agent (such as a foaming agent whose shell part is an acrylonitrile copolymer resin), and the adhesiveness after foamed and cured is improved by being uniformly dispersed and foamed. Also, the hardness of the adhesive layer surface may be maintained at high level, by the acrylic resin being compatibilized with the epoxy resin. Meanwhile, if the acrylic resin is incompatible with the epoxy resin, a flexible part is formed on the adhesive layer surface so that the interface with the adherend is not slippery enough, and the workability may be deteriorated.

The acrylic resin in the present disclosure is compatibilized with the epoxy resin. Here, the state that the acrylic resin being compatibilized with the epoxy resin may be confirmed by, for example, observing the cross-section of the adhesive layer of the foaming adhesive sheet with a scanning electron microscope (SEM) or a transmission electron microscope (TEM), to confirm that a micron sized island is not formed. More specifically, the average particle size of the island is preferably 1 μm or less. Among the above, the average particle size of the island may be 0.5 μm or less, and may be 0.3 μm or less. The number of the samples is preferably large, and is, for example, 100 or more. The area of the observed region is in a range of 100 μm×100 μm or, when the average thickness of the adhesive layer is 100 μm or less, the observation is carried out in a range of average thickness×100 μm.

The weight-average molecular weight (Mw) of the acrylic resin is, for example, 50,000 or more, may be 70,000 or more, and may be 100,000 or more. The first epoxy resin is relatively high in crystallinity so that the melt viscosity (or dynamic viscoelasticity) upon heating may be too low, and a shrinkage may occur during curing after foaming (the term from the completion of foaming of the foaming agent until the adhesive composition is cured). However, by using the acrylic resin having a certain level of molecular weight, the melt viscosity may be suppressed from being too low so that the shrinkage during curing after foaming is less likely to occur. Meanwhile, Mw of the acrylic resin is, for example, 1,500,000 or less. The weight-average molecular weight of the acrylic resin may be measured by GPC (eluent: THF, standard substance: PS, sample: 20 μl, flow: 1 ml/min, column temperature: 40° C.).

The glass transition temperature (Tg) of the acrylic resin is, for example, 90° C. or more, and may be 100° C. or more. Meanwhile, Tg of the acrylic resin is, for example, 180° C. or less. Tg may be measured by a thermal analysis such as differential scanning calorimetry (DSC) according to JIS K7121 corresponding to ISO 3146.

The storage elastic modulus (E') of the acrylic resin at foaming start temperature may be $1\times10^6$ Pa or less. By E' being low at the start of the foaming, the flowability is improved so that preferable foaming ability may be obtained. Meanwhile, E' at foaming start temperature is, for example, $1\times10^5$ Pa or more. Incidentally, foaming start temperature is temperature that varies according to the kind of the foaming agent. Also, when two kinds or more of the foaming agents are used as the foaming agent, foaming start temperature of the main foaming reaction is regarded as foaming start temperature.

The storage elastic modulus (E') of the acrylic resin at curing start temperature may be $1\times10^5$ Pa or more. As described above, the shrinkage may occur during curing after foaming (the term from the completion of foaming of the foaming agent until the adhesive composition is cured). However, the shrinkage may be suppressed and preferable shape retainability may be obtained by E' being high at curing start temperature. Incidentally, curing start temperature is temperature that varies according to the kind of the curing agent. Also, when two kinds or more of the curing agents are used as the curing agent, curing start temperature of the main curing reaction is regarded as curing start temperature.

Also, the average value of the storage elastic modulus (E') of the acrylic resin at 0° C. or more and 100° C. or less may be $1\times10^6$ Pa or more. A preferable blocking resistance may be obtained by the average value of E' before the foaming being high. Meanwhile, the average value of the storage elastic modulus (E') at 0° C. or more and 100° C. or less is, for example, $1\times10^8$ Pa or less.

The acrylic resin may include a polar group. Examples of the polar group may include an epoxy group, a hydroxyl group, a carboxyl group, a nitrile group, and an amide group.

The acrylic resin may be a homopolymer of acrylic acid ester monomers that is a mixture component including two kinds or more of the above described homopolymer; and may be a copolymer of two kinds or more acrylic acid ester monomers that is a component including one or more copolymer. Also, the acrylic resin may be a mixture component of the homopolymer and the copolymer. The "acrylic acid" in the acrylic acid ester monomers includes the concept of a methacrylic acid. Specifically, the acrylic resin may be a mixture of the methacrylate polymer and the acrylate polymer, and may be an acrylic acid ester polymer such as acrylate-acrylate, methacrylate-methacrylate, and methacrylate-acrylate. Among them, the acrylic resin preferably includes a copolymer of two kinds or more acrylic acid ester monomers ((meth)acrylic acid ester copolymer).

Examples of the monomer component constituting the (meth)acrylic acid ester copolymer may include the monomer component described in Japanese Patent Application Laid-Open (JP-A) No. 2014-065889. The monomer component may include the above described polar group. Examples of the (meth)acrylic acid ester copolymer may include an ethyl acrylate-butyl acrylate-acrylonitrile copolymer, an ethyl acrylate-acrylonitrile copolymer, and a butyl acrylate-acrylonitrile copolymer. Incidentally, the "acrylic acid" such as acrylic acid methyl and acrylic acid ethyl includes "methacrylic acid" such as (meth)acrylic acid methyl and (meth)acrylic acid ethyl.

As the (meth) acrylic acid ester copolymer, a block copolymer is preferable, and an acrylic block copolymer such as a methacrylate-acrylate copolymer is further preferable. Examples of the (meth) acrylate constituting the acrylic block copolymer may include methyl acrylate, ethyl acrylate, propyl acrylate, butyl acrylate, lauryl acrylate, 2-ethylhexyl acrylate, cyclohexyl acrylate, and benzyl acrylate. These "acrylic acid" also includes "methacrylic acid".

Specific examples of the methacrylate-acrylate copolymer may include acrylic copolymers such as methyl methacrylate-butyl acrylate-methyl methacrylate (MMA-BA-MMA) copolymers. MMA-BA-MMA copolymers also include block copolymers of polymethylmethacrylate-polybutylacrylate-polymethylmethacrylate (PMMA-PBA-PMMA).

The acrylic copolymer may not include a polar group, and may be a modified product wherein the above described polar group is introduced into a part. Since the modified product is easily compatible with an epoxy resin, adhesiveness is further improved.

Among them, the acrylic resin is preferably a (meth) acrylic acid ester copolymer including a first polymer portion having glass transition temperature (Tg) of 10° C. or less, and a second polymer portion having glass transition temperature (Tg) of 20° C. or more. Such a (meth) acrylic acid ester copolymer includes a first polymer portion to be a soft segment and a second polymer portion to be a hard segment.

The expression of the above effect may be estimated as follows. By using an acrylic resin including both of a soft segment and a hard segment, such as the above (meth) acrylic acid ester copolymer, the hard segment contributes to heat resistance, and the soft segment contributes to toughness or flexibility, so that an adhesive layer having good heat resistance, toughness, and flexibility may be obtained.

At least one of the first polymer portion and the second polymer portion included in the above (meth) acrylic acid ester copolymer has compatibility with the epoxy resin. When the first polymer portion has compatibility with the epoxy resin, flexibility may be increased. Also, when the second polymer portion has compatibility with the epoxy resin, it is possible to enhance the cohesiveness and toughness.

When one of the first polymer portion and the second polymer portion has no compatibility with the epoxy resin, the (meth) acrylic acid ester copolymer includes a compatible site that is a polymer portion compatible with the epoxy resin and an incompatible site that is a polymer portion not compatible with the epoxy resin. In this case, when the above (meth) acrylic acid ester copolymer is added to the adhesive composition, the compatible site is compatibilized with the epoxy resin, and the incompatible site is not compatibilized with the epoxy resin, so that fine phase separation occurs. As the result, a fine sea-island structure is developed. The sea-island structure differs according to the type of the (meth) acrylic acid ester copolymer, the compatibility of the first polymer portion and the second polymer portion included in the (meth) acrylic acid ester copolymer, and the existence or non-existence of modification by introducing a polar group. Examples thereof may include a sea-island structure wherein a cured product of the epoxy resin and a compatible site of the (meth) acrylic acid ester copolymer are seas, and a non-compatible site of the (meth) acrylic acid ester copolymer is an island; a sea-island structure wherein a non-compatible site of the (meth) acrylic acid ester copolymer is a sea, and a cured product of the epoxy resin and a compatible site of the (meth) acrylic acid ester copolymer are islands; and a sea-island structure wherein the (meth) acrylic acid ester copolymer is a sea, and a cured product of the epoxy resin is an island. By having such a sea-island structure, it is possible to easily disperse the stress, so that it is possible to avoid interfacial breakage and to obtain excellent adhesiveness after foamed and cured.

Among the above, the (meth) acrylic acid ester copolymer is preferably a block copolymer, and particularly preferably an A-B-A block copolymer including a polymer block A as a compatible site and a polymer block B as a non-compatible site. Further, it is preferable to be a A-B-A block copolymer wherein the first polymer portion is a non-compatible site and the second polymer portion is a compatible site, and the first polymer portion is a polymer block B and the second polymer portion is a polymer block A. By using such an A-B-A block copolymer as an acrylic resin, the island portion may be decreased in the sea-island structure wherein a cured product of the epoxy resin and a compatible site of the (meth) acrylic acid ester copolymer are seas, and a non-compatible site of the (meth) acrylic acid ester copolymer is an island. Also, the sea portion may be decreased in the case of the sea-island structure wherein a non-compatible site of the (meth) acrylic acid ester copolymer is a sea, a cured product of the epoxy resin, and a compatible site of the (meth) acrylic acid ester copolymer are islands; or in the case of the sea-island structure wherein the (meth) acrylic acid ester copolymer is a sea and a cured product of the epoxy resin is an island.

Further, the above (meth) acrylic acid ester copolymer may be a modified product obtained by introducing the above mentioned polar group into a part of the first polymer portion or the second polymer portion.

Tg of the first polymer portion included in the (meth) acrylic acid ester copolymer may be 10° C. or less, may be in a range of −150° C. or more and 10° C. or less, among the above, in a range of −130° C. or more and 0° C. or less, particularly in a range of −110° C. or more and −10° C. or less.

Incidentally, Tg of the first polymer portion may be determined by calculating according to the following formula based on Tg (K) of each homopolymer described in “POLYMERHANDBOOK 3rd Edition” (issued by John Wiley & Sons, Ink.)

$$1/Tg(K)=W_1/Tg_1+W_2/Tg_2+ \ldots +W_n/Tg_n$$

$W_n$; mass fraction of each monomer $Tg_n$; Tg (K) of the homopolymer of the each monomer and publicly available listed values such as those in the Polymer Handbook (3rd Ed., J. Brandrup and E. H. Immergut, WILEY INTERSCIENCE) may be used. The same applies to Tg of the second polymer portion described later.

The first polymer portion included in the (meth) acrylic acid ester copolymer may be a homopolymer, and may be a copolymer; among them, a homopolymer is preferable. The monomer component and the polymer component constituting the first polymer portion may be any monomer component and a polymer component capable of obtaining a first polymer portion with Tg in a predetermined range, and examples thereof may include acrylic acid ester monomers such as acrylic acid butyl, acrylic acid 2-ethylhexyl, acrylic acid isononyl, and acrylic acid methyl; other monomers such as vinyl acetate, acetal, and urethane; a polar group containing monomer including the above described polar group; and copolymers such as EVA.

Tg of the second polymer portion included in the (meth) acrylic acid ester copolymer is 20° C. or more, may be in a range of 20° C. or more and 150° C. or less, among the above, in a range of 30° C. or more and 150° C. or less, particularly in a range of 40° C. or more and 150° C. or less.

Also, the second polymer portion included in the (meth) acrylic acid ester copolymer may be a homopolymer, may be a copolymer; among them, a homopolymer is preferable. The monomer component constituting the second polymer portion may be any monomer component capable of obtaining a second polymer portion with Tg in a predetermined range, and examples thereof may include acrylic acid ester monomers such as methyl methacrylate; other monomers such as acrylamide, styrene, vinyl chloride, amide, acrylonitrile, cellulose acetate, phenol, urethane, vinylidene chloride, methylene chloride, and methacrylonitrile; and a polar group containing monomers including the above described polar group.

Specific examples of the (meth) acrylic acid ester copolymer including the first polymer portion and the second polymer portion described above may include the above described MMA-BA-MMA copolymers.

The content of the acrylic resin when the resin component included in the adhesive layer is regarded as 100 mass parts is, for example, 1 mass part or more, may be 3 mass parts or more, may be 5 mass parts or more, may be 7 mass parts or more, and may be 10 mass parts or more. When the content of the acrylic resin is too low, the close adhesiveness of the adhesive layer with respect to the substrate and the adhesiveness after foamed and cured may be deteriorated. Meanwhile, the content of the acrylic resin when the resin component included in the adhesive layer is regarded as 100 mass parts is, for example, 60 mass parts or less, may be 50 mass parts or less, may be 40 mass parts or less, may be 35 mass parts or less, and may be 30 mass parts or less. When the content of the acrylic resin is too high, the content of the first epoxy resin and the second epoxy resin will be relatively low so that the close adhesiveness of the adhesive layer with respect to the substrate, the blocking resistance, and the adhesiveness after foamed and cured may not be balanced.

(iii) Curing Agent

The curing agent in the present disclosure is appropriately selected according to the type of the curable adhesive. When the curable adhesive is, for example, an epoxy resin based adhesive, a curing agent generally used in an epoxy resin based adhesive may be used as the curing agent. The curing agent is preferably solid at 23° C. The curing agent that is solid at 23° C. may improve storage stability (pot life), compared to the curing agent that is liquid at 23° C. Also, the curing agent may be a latent curing agent. Also, the curing agent may be a curing agent wherein a curing reaction occurs by heat, and may be a curing agent wherein a curing reaction occurs by light. Also, in the present disclosure, a curing agent may be used alone, and 2 kinds or more of them may be used.

Reaction start temperature of the curing agent is, for example, 110° C. or more, and may be 130° C. or more. If reaction start temperature is too low, the reaction may be started early, and curing may occur in a condition where the flexibility and fluidity of the resin component are low, and uniform curing may hardly occur. Meanwhile, reaction start temperature of the curing agent is, for example, 200° C. or less. If reaction start temperature is too high, there is a possibility that the resin component is deteriorated. Incidentally, in addition to the epoxy resin, for example, when a resin having high heat resistance such as a phenol resin is used, since deterioration of the resin component is small, reaction start temperature of the curing agent may be, for example, 300° C. or less. Reaction start temperature of the curing agent may be determined by differential scanning calorimetry (DSC).

Specific examples of the curing agent may include an imidazole based curing agent, a phenol based curing agent, an amine based curing agent, an acid anhydride based curing agent, an isocyanate based curing agent, and a thiol based curing agent.

Examples of the imidazole based curing agent may include imidazoles, 2-phenyl-4,5-dihydroxymethylimidazole, 2-phenyl-4-methyl-5-hydroxymethylimidazole, 2-methylimidazole, 2-ethylimidazole, 2-ethyl-4-methylimidazole, 2-isopropylimidazole, 2-phenylimidazole, carboxylates of imidazole compounds, and adducts with epoxy compounds. Also, it is preferable that the imidazole based curing agent includes a hydroxyl group. Since it crystallizes by hydrogen bonding between hydroxy groups, reaction start temperature tends to be high.

Examples of the phenol based curing agent may include phenol resins. Further, examples of the phenol resin may include a resol type phenol resin and a novolac type phenol resin. From the viewpoint of the close adhesiveness of the adhesive layer with respect to the substrate, for example, a phenol type novolac resin having a Tg of 110° C. or less is particularly preferable. Also, a phenol based curing agent and an imidazole based curing agent may be used in combination. In this case, it is preferable to use an imidazole based curing agent as a curing catalyst.

Incidentally, the heat resistance may be improved by including the phenol resin in the adhesive layer. Meanwhile, the toughness is decreased, so that there is a concern that the adhesive layer may be lifted or peeled off from the substrate when, for example, the foaming adhesive sheet is folded or cut. In contrast to this, since the close adhesiveness of the adhesive layer with respect to the substrate is excellent in the present disclosure, the occurrence of the lifting off or peeling off of the adhesive layer from the substrate, when folded, may be suppressed even when the adhesive layer incudes the phenol resin. As the result, both of the improvement of the heat resistance, and the suppressing or the occurrence of the lifting off or peeling off of the adhesive layer from the substrate when folded, may be realized in the foaming adhesive sheet.

The phenol resin is preferably a biphenyl type in view of the heat resistance. Also, the phenol resin may be a resin wherein a phenol nucleus is modified. By modifying the phenol nucleus, for example, the heat resistance may further be improved.

Meanwhile, when the adhesive layer does not include the phenol resin, the occurrence of the lifting off or peeling off of the adhesive layer from the substrate, when folded or cut, may be suppressed effectively so that the close adhesiveness of the adhesive layer with respect to the substrate may be improved.

Examples of the amine based curing agent may include aliphatic amines such as diethylenetriamine (DETA), triethylenetetramine (TETA), and meta-xylenediamine (MXDA); aromatic amines such as diaminodiphenylmethane (DDM), m-phenylenediamine (MPDA), and diaminodiphenylsulfone (DDS); alicyclic amines; and polyamidoamines. Also, as an amine based curing agent, a dicyandiamide based curing agent such as dicyandiamide (DICY); an organic acid dihydrazide based curing agent; an amine adduct based curing agent; and a ketimine based curing agent may be used.

Examples of the acid anhydride based curing agent may include alicyclic acid anhydrides (liquid acid anhydrides) such as hexahydrophthalic anhydride (HHPA) and methyltetrahydrophthalic anhydride (MTHPA); and aromatic acid anhydrides such as trimellitic anhydride (TMA), pyromellitic dianhydride (PMDA), and benzophenone tetracarboxylic dianhydride (BTDA).

Examples of the isocyanate based curing agent may include blocked isocyanate.

Examples of the thiol based curing agent may include an ester binding type thiol compound, an aliphatic ether binding type thiol compound, and an aromatic ether binding type thiol compound.

The content of the curing agent when the resin component included in the adhesive layer is regarded as 100 mass parts is, for example, 1 mass part or more and 40 mass parts or less. For example, when an imidazole based curing agent is used as a main component as the curing agent, the content of the curing agent when the resin component included in the adhesive layer is regarded as 100 mass parts is preferably, for example, 1 mass part or more and 15 mass parts or less. Meanwhile, when a phenol based curing agent is used as a main component as a curing agent, the content of the curing agent when the resin component included in the adhesive layer is regarded as 100 mass parts is preferably, for example, 5 mass parts or more and 40 mass parts or less. Incidentally, the use of an imidazole based curing agent or a phenol based curing agent as a main component as the curing agent means that the mass proportion of the imidazole based curing agent or the phenol based curing agent is the highest in the curing agent.

(b) Foaming Agent

As the foaming agent in the present disclosure, a foaming agent generally used for an adhesive layer of a foaming adhesive sheet may be used. Also, the foaming agent may be a foaming agent wherein a foaming reaction occurs by heat, and may be a foaming agent wherein a foaming reaction occurs by light.

It is preferable that foaming start temperature of the foaming agent is the softening temperature or more of the base resin of the curable adhesive such as the epoxy resin and also, activation temperature or less of the curing reaction of the base resin of the curable adhesive such as the epoxy resin. Foaming start temperature of the foaming agent is, for example, 70° C. or more, and may be 100° C. or more. If reaction start temperature is too low, the reaction may be started early, and foaming may occur in a condition where the flexibility and fluidity of the resin component are low, and uniform foaming may hardly occur. Meanwhile, reaction start temperature of the foaming agent is, for example, 210° C. or less. If reaction start temperature is too high, there is a possibility that the resin component is deteriorated.

Incidentally softening temperature of the base resin of the curable adhesive such as the epoxy resin may be measured using the ring and ball type softening temperature testing method specified in JIS K7234.

Examples of the foaming agent may include an organic based foaming agent and an inorganic based foaming agent. Examples of the organic based foaming agent may include azo foaming agents such as azodicarbonamide (ADCA), azobisformamide, and azobisisobutyronitrile; a fluorinated alkane based foaming agents such as trichloromonofluoromethane; a hydrazine based foaming agents such as paratoluenesulfonylhydrazide; a semicarbazide based foaming agents such as p-toluenesulfonylsemicarbazide; a triazole based foaming agent such as 5-morpholyl-1,2,3,4-thiatriazole; and N-nitroso based foaming agents such as a N,N-dinitrosoterephthalamide. Meanwhile, examples of the inorganic based foaming agent may include ammonium carbonate, ammonium hydrogencarbonate, ammonium nitrite, ammonium borohydride, and azides.

Also, a microcapsule type foaming agent may be used as the foaming agent. It is preferable that the microcapsule type foaming agent includes a thermal expansion agent such as a hydrocarbon as a core, and a resin such as an acrylonitrile copolymer as a shell.

The average particle size of the foaming agent may be, for example, 7 μm or more, may be 10 μm or more, may be 13 μm or more, and may be 17 μm or more. When the average particle size of the foaming agent is 10 μm or more, the pencil hardness of the adhesive layer side surface of the foaming adhesive sheet may be increased, and the static friction coefficient of the adhesive layer side surface of the foaming adhesive sheet may be decreased so that the sliding property and the inserting property may further be improved. Meanwhile, the average particle size of the foaming agent is preferably the average thickness of the adhesive layer or less.

Further, the average particle size of the foaming agent is preferably, for example, 10 μm or more and 24 μm or less. The average particle size of the foaming agent may be, for example, 13 μm or more, and may be 17 μm or more. Also, the average particle size of the foaming agent may be, for example, 21 μm or less, and may be 20 μm or less. By the average particle size of the foaming agent being in the range described above, the adhesiveness may be improved even when the gap between the members is relatively wide. The reason therefor is not necessarily clear, but presumed as follows. That is, since the foaming magnification of the adhesive layer tends to be low when the average particle size is too small, an excellent adhesiveness may be obtained when the gap between the members is narrow, whereas the adhesiveness may be lowered when the gap between the members is wide. Also, when the average particle size is small, the foaming magnification of the adhesive layer may be increased by increasing the content of the foaming agent. However, since the content of the curable adhesive is relatively decreased when the content of the foaming agent is increased, the wall between the air bubbles will be thin, or the agglomerating property is decreased in the adhesive layer after foamed and cured, so that the adhesiveness when the gap between the members is wide, is believed to be decreased. Meanwhile, since the air bubbles after foamed will be large when the average particle size of the foaming agent is too large, the wall between the air bubbles will be thin, or the agglomerating property is decreased in the adhesive layer after foamed and cured, so that the adhesiveness when the gap between the members is narrow, is also believed to be decreased. In contrast to this, when the average particle size of the foaming agent is in the range described above, the gap between the members may be filled sufficiently since the foaming magnification is not too small. Also, since the air bubble after foamed is not too large, the wall between the air bubbles is thick in the adhesive layer after foamed and cured so that the contacting area of the wall between the air bubbles with the member may be increased in the adhesive layer after foamed and cured. As the result, it is presumed that excellent adhesiveness is obtained not only when the gap between the members is narrow, but also when the gap between the members is wide.

Incidentally, the average particle size of the foaming agent is a particle size at integrated value of 50% in the particle size distribution determined by a laser diffraction/scattering method. Also, when measuring the average particle size of the foaming agent, the foaming agent is separated by dissolving the adhesive layer in a solvent. The solvent is not particularly limited as long as the solvent is capable of dissolving the components other than the foaming agent included in the adhesive layer, and is appropriately selected according to the type, for example, of the curable adhesive included in the adhesive layer. For example, a solvent used for an adhesive composition used to form an adhesive layer may be used. Specifically, for example, methyl ethyl ketone, ethyl acetate, and toluene may be used.

The content of the foaming agent when the resin component included in the adhesive layer is regarded as 100 mass parts is, for example, 0.5 mass parts or more, may be 2 mass parts or more, may be 3 mass parts or more, may be 4 mass parts or more, and may be 5 mass parts or more. Meanwhile, the content of the foaming agent when the resin component included in the adhesive layer is regarded as 100 mass parts is, for example, 25 mass parts or less, may be 20 mass parts or less, and may be 15 mass parts or less. When the content of the foaming agent is too low, the static friction coefficient of the adhesive layer side surface of the foaming adhesive sheet is increased, or the pencil hardness of the adhesive layer side surface of the foaming adhesive sheet is decreased so that the sliding property and the inserting property may be deteriorated. Also, when the content of the foaming agent is too low, the foaming magnification of the adhesive layer is decreased so that the adhesiveness may be deteriorated when the gap between the members is wide. Meanwhile, when the content of the foaming agent is too much, since the content of the curable adhesive is relatively decreased, the wall between the air bubbles will be thin, or the agglomerating property is decreased in the adhesive layer after foamed and cured, so that the adhesiveness may be deteriorated. Incidentally, when the average particle size of the foaming agent is 10 μm or more and 24 μm or less, the adhesiveness when the gap between the members is narrow and when the gap between the members is wide may further be improved by setting the content of the foaming agent to 3 mass parts or more and 25 mass parts or less, when the resin component included in the adhesive layer is regarded as 100 mass parts.

(c) Other Component

For example, when the curable adhesive is the epoxy resin based adhesive, the adhesive layer in the present disclosure may include only the epoxy resin and the acrylic resin as the resin component, and may further include other resins. Examples of the other resin may include urethane resins.

The proportion of the total of the first epoxy resin, the second epoxy resin and the acrylic resin with respect to the resin components included in the adhesive layer is, for example, 70 mass % or more, may be 80 mass % or more, may be 90 mass % or more, and may be 100 mass %.

The content of the resin components included in the adhesive layer is, for example, 60 mass % or more, may be 70 mass % or more, may be 80 mass % or more, and may be 90 mass, or more.

The adhesive layer may include, if necessary, for example, a silane coupling agent, a filler, an antioxidant, a light stabilizer, an ultraviolet absorber, a lubricant, a plasticizer, an antistatic agent, a cross-linking agent, and a colorant. Examples of the silane coupling agent may include an epoxy based silane coupling agent. Examples of the filler may include inorganic fillers such as calcium carbonate, aluminum hydroxide, magnesium hydroxide, antimony trioxide, zinc borate, molybdenum compounds, and titanium dioxide. Examples of the antioxidant may include a phenol based antioxidant and a sulfur based antioxidant.

(2) Constitution of Adhesive Layer

The adhesive layer is capable of foaming at foaming magnification of, for example, 1.5 times or more and 15 times or less. The foaming magnification may be, for example, 3.5 times or more, may be 4 times or more, and may be 4.5 times or more. Also, the foaming magnification may be, for example, 9 times or less, may be 8.5 times or less, and may be 8 times or less. When the average particle size of the foaming agent is in a predetermined range, the adhesiveness when the gap between the members is wide tends to be high by the foaming magnification being 3.5 times or more and 9 times or less. Meanwhile, when the foaming magnification is too low, the adhesiveness when the gap between the members is wide may be decreased. Also, when the foaming magnification is too high, the adhesiveness may be decreased even when the gap between the members is narrow.

Here, the foaming magnification may be determined by the following formula.

Foaming magnification (times)=adhesive layer thickness after foamed and cured/adhesive layer thickness before foaming and curing The average thickness of the adhesive layer is not particularly limited, and is preferably average particle size of the foaming agent or more, for example, 10 μm or more, may be 15 μm or more, and may be 20 μm or more. When the adhesive layer is too thin, the close adhesiveness with respect to the substrate and the adhesiveness after foamed and cured may not be sufficiently obtained. Meanwhile, the average thickness of the adhesive layer is, for example, 200 μm or less, may be 150 μm or less, and may be 100 μm or less. When the adhesive layer is too thick, the quality of the surface may be deteriorated, and the pencil hardness may be decreased.

Here, the average thickness of the adhesive layer is a value measured from a cross-section in the thickness direction of the foaming adhesive sheet observed with a transmission electron microscope (TEM), a scanning electron microscope (SEM), or a scanning transmission type electron microscope (STEM), and may be an average value of the thickness at 10 locations selected at random. Incidentally, this is similar to a method for measuring an average thickness of other layer included in the foaming adhesive sheet.

The adhesive layer may be a continuous layer, and may be a discontinuous layer. Example of the discontinuous layer may include patterns such as stripes and dots. Also, the surface of the adhesive layer may have a concavo-convex shape such as emboss.

The adhesive layer may be formed, for example, by applying an adhesive composition including the curable adhesive and the foaming agent, for example, and removing a solvent. Examples of application methods may include roll coating, reverse roll coating, transfer roll coating, gravure coating, gravure reverse coating, comma coating, rod coating, blade coating, bar coating, wire bar coating, die coating, lip coating, and dip coating.

The adhesive composition may include a solvent and may not include a solvent. Incidentally, the solvent in the present descriptions is in a broad sense including not only a strict solvent (a solvent for dissolving a solute) but also a dispersion medium. Also, the solvent included in the adhesive composition is volatilized and removed when the adhesive composition is applied and dried to form an adhesive layer.

The adhesive composition may be obtained by mixing each of the above described components and kneading and dispersing them, if necessary. Examples of the mixing and dispersing methods may include common kneading dispersers such as twin roll mills, triple roll mills, pebble mills, trommels, Szegvari attritors, high-speed impeller dispersers, high-speed stone mills, high-speed impact mills, Despar, high-speed mixers, ribbon blenders, cokneaders, intensive mixers, tumblers, blenders, dispersers, homogenizers, and ultrasonic dispersers.

3. Substrate

The substrate in the present disclosure preferably has an insulating property. Also, it is preferable that the substrate is in a sheet form. The substrate sheet may have a single layer structure, and may have a multiple layer structure. Also, the substrate sheet may or may not have a porous structure inside.

Examples of the substrate may include a resin substrate and a nonwoven fabric.

Examples of the resin included in the resin substrate may include polyester resins such as polyethylene terephthalate (PET), polybutylene terephthalate, polyethylene naphthalate (PEN), and aromatic polyesters; polycarbonates; polyarylates; polyurethanes; polyamide resins such as polyamides, and polyetheramides; polyimide resins such as polyimides, polyetherimides, and polyamideimides; polysulfone resins such as polysulfones, and polyethersulfones; polyetherketone resins such as polyetherketones, and polyether ether ketones; polyphenylene sulfides (PPS); and modified polyphenylene oxides. The glass transition temperature of the resin is, for example, 80° C. or more, may be 140° C. or more, and may be 200° C. or more. Also, a liquid crystal polymer (LCP) may be used as the resin.

Examples of the nonwoven fabric may include nonwoven fabrics including fibers such as cellulose fibers, polyester fibers, nylon fibers, aramid fibers, polyphenylene sulfide fibers, liquid crystal polymer fibers, glass fibers, metal fibers, and carbon fibers.

Among the above, the substrate preferably includes polyphenylene sulfides (PPS) or polyethylene naphthalate (PEN). Polyphenylene sulfides and polyethylene naphthalate are high in heat resistance, and are preferable when the foaming adhesive sheet is foamed and cured by heating. Also, polyphenylene sulfides and polyethylene naphthalate are high in insulating property so that between the members may be insulated by, for example, the foaming adhesive sheet after foamed and cured. Also, although polyphenylene sulfides and polyethylene naphthalate are usually low in the wettability with the adhesive, and close adhesiveness with the adhesive layer is not high, the close adhesiveness of the adhesive layer with respect to the substrate may be improved in the present disclosure. Therefore, heat resistance, insulating property, and the close adhesiveness of the substrate and the adhesive layer may be balanced in the foaming adhesive sheet.

In order to improve the close adhesiveness with respect to the adhesive layer, the surface of the substrate where the adhesive layer is placed, may be subjected to a surface treatment. Examples of the surface treatment may include a corona treatment, a blast treatment, a plasma treatment, a frame treatment, an Itro treatment, a hydrophilic treatment by fluorine gas. Among the surface treatment, a blast treatment is preferable. When the adhesive layer gets into the uneven microstructure of the blast treated substrate surface, the close adhesiveness between the substrate and the adhesive layer is improved, that is, an anchor effect may be obtained. Also, since the blast treatment is a treatment to obtain a coarsened surface, it is believed that the close adhesiveness of the substrate and the adhesive layer is stabled, compared to a surface activating treatment such as a corona treatment.

Also, a surface treatment layer may be placed on the surface of the substrate where the adhesive layer is placed. Examples of the surface treatment layer may include a silicon oxide film. Examples of the method for forming the surface treatment layer may include a CVD method and a PVD method.

The average thickness of the substrate is not particularly limited, and is, for example, 2 μm or more, may be 5 μm or more, and may be 9 μm or more. Also, the average thickness of the substrate is, for example, 200 μm or less, may be 100 μm or less, and may be 50 μm or less.

4. Intermediate Layer

The foaming adhesive sheet in the present disclosure preferably includes an intermediate layer between the substrate and the adhesive layer. By placing the intermediate layer, the close adhesiveness of the adhesive layer with respect to the substrate may further be improved. Further, by placing the intermediate layer, for example, the stress applied to a bent portion when the foaming adhesive sheet is bent, may be eased, or the stress applied to a cut portion when the foaming adhesive sheet is cut, may be eased. As the result, lifting off or peeling off of the adhesive layer from the substrate may be suppressed effectively not only when the foaming adhesive sheet is bent but also when the foaming adhesive sheet is cut.

Figure 3:
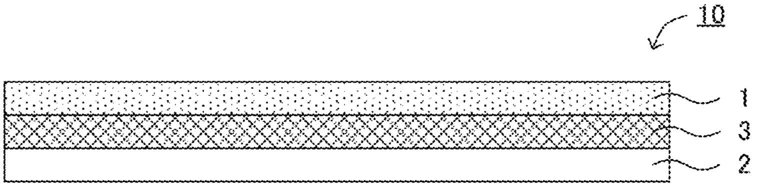
FIG. 3 is a schematic cross-sectional view illustrating another example of a foaming adhesive sheet in the present disclosure.
Figure 4:
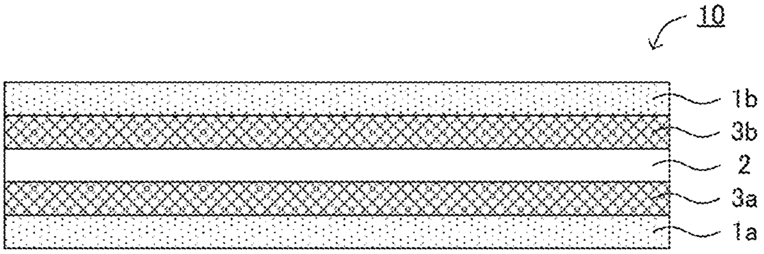
FIG. 4 is a schematic perspective view illustrating another example of a foaming adhesive sheet in the present disclosure.

For example, in foaming adhesive sheet 10 shown in FIG. 3, substrate 2, intermediate layer 3, and adhesive layer 1 are placed in this order in the thickness direction. Also, in foaming adhesive sheet 10 shown in FIG. 4, first adhesive layer 1*a* is placed on one surface side of the substrate 2, second adhesive layer 1*b* is placed on the other surface side of the substrate 2, first intermediate layer 3*a* is placed between the substrate 2 and the first adhesive layer 1*a*, and second intermediate layer 3*b* is placed between the substrate 2 and the second adhesive layer 1*b*. Incidentally, in FIG. 4, although the foaming adhesive sheet 10 includes both first intermediate layer 3*a* and the second intermediate layer 3*b*, only either one may be included.

When the adhesive layer is placed on both surface sides of the substrate, the intermediate layer may be placed between substrate and at least one adhesive layer. For example, the intermediate layer may be placed between the substrate and only one adhesive layer, and the intermediate layer may be placed between the substrate and both adhesive layers. Among the above, the intermediate layer is preferably placed between the substrate and both adhesive layers.

The material included in the intermediate layer is not particularly limited as long as the material is capable of improving the close adhesiveness of the substrate and the adhesive layer, and capable of releasing the stress, and the material is appropriately selected according to the material or the like of the substrate and the adhesive layer. Examples thereof may include polyester, polyvinyl chloride, polyvinyl acetate, polyurethane, a polymer obtained by copolymerizing at least 2 kinds or more of them, cross-linked material thereof, and mixture thereof.

The cross-linked material is a cross-linked material wherein the resin described above is cross-linked by a curing agent. Examples of the curing agent may include an isocyanate based curing agent. Also, for example, when reactive group/NCO equivalent is regarded as 1, the isocyanate based curing agent is preferably added at proportion of 0.5 mass % or more and may be 20 mass % or less, with respect to the resin.

Among the above, the intermediate layer preferably includes a cross-linked resin. Incidentally, the cross-linked resin means those not fused at high temperature. Thereby, the adhesive force under high temperature, that is, the heat resistance may be improved. Also, when the cross-linked resin is cross-linked by, for example, the isocyanate based curing agent, the flexibility of the intermediate layer is improved so that a crack of the adhesive layer, or lifting off or peeling off of the adhesive layer from the substrate, when the foaming adhesive sheet is bent, may be suppressed.

Examples of the cross-linked resin may include the cross-linked material described above. Among the above, the intermediate layer preferably includes a cross-linked polyester resin. When the intermediate layer includes the cross-linked polyester resin, the close adhesiveness of the substrate and the adhesive layer tends to be increased. Particularly, when the substrate includes polyphenylene sulfides (PPS) or polyethylene naphthalate (PEN), and the adhesive layer includes an epoxy resin based adhesive as the curable adhesive, the close adhesiveness of the substrate and the adhesive layer may be improved by including the cross-linked polyester resin in the intermediate layer.

The cross-linked polyester resin is a cross-linked material of polyester, a copolymer including polyester, or a mixture including polyester, specifically, it is a cross-linked material wherein polyester, a copolymer including polyester, or a mixture including polyester is cross-linked by a curing agent. Examples of the polyester may include polyester polyol. Examples of the curing agent may include an isocyanate based curing agent. Incidentally, the adding amount of the curing agent is as described above.

The average thickness of the intermediate layer is not particularly limited as long as the peeling force of the surface side of the foaming adhesive sheet where the adhesive layer is placed, measured by a SAICAS method may be set to a predetermined value or more, and is, for example, 0.1 μm or more, may be 0.5 μm or more, and may be 1 μm or more. When the intermediate layer is too thin, there is a possibility that sufficient effect of suppressing the peeling off of the adhesive layer from the substrate when the foaming adhesive sheet is bent or cut, may not be obtained. Meanwhile, the average thickness of the intermediate layer is, for example, 4 μm or less, and may be 3.5 or less. Since the heat resistance of the intermediate layer itself is usually not high, when the intermediate layer is too thick, the heat resistance (adhesive strength under high temperature) may be reduced. Incidentally, when a substrate with relatively high heat resistance such as polyethylene naphthalate (PEN) or polyphenylene sulfides (PPS) is used, the close adhesiveness and the heat resistance may further be improved by setting the average thickness of the intermediate layer to 0.5 μm or more and 4 μm or less.

The intermediate layer may be formed, for example, by applying a resin composition and removing a solvent. Examples of application methods may include roll coating, reverse roll coating, transfer roll coating, gravure coating, gravure reverse coating, comma coating, rod coating, blade coating, bar coating, wire bar coating, die coating, lip coating, and dip coating.

5. Foaming Adhesive Sheet

The average thickness of the foaming adhesive sheet in the present disclosure is, for example, 10 μm or more, and may be 20 μm or more. Meanwhile, the average thickness of the foaming adhesive sheet is, for example, 1000 μm or less, and may be 200 μm or less.

The application of the foaming adhesive sheet in the present disclosure is not particularly limited. The foaming adhesive sheet in the present disclosure may be used, for example, when members are adhered to each other by placing the foaming adhesive sheet between the members, and then, forming and curing the foaming adhesive sheet. Also, in the present disclosure, lifting off or peeling off of the adhesive layer from the substrate may be suppressed when the foaming adhesive sheet is placed between members, even when the member has a burr. Therefore, the foaming adhesive sheet in the present disclosure may be used when adhering a member wherein a burr easily occurs, such as a metal member and a resin member. Among the above, the foaming adhesive sheet in the present disclosure may be preferably used when members are adhered to each other by placing the foaming adhesive sheet between metal members.

6. Method for Producing Foaming Adhesive Sheet

A method for producing a foaming adhesive sheet in the present disclosure is not particularly limited. Examples thereof may include a method wherein an adhesive layer is formed by applying the adhesive composition described above on one surface side of a substrate, and drying. When a first adhesive layer is formed on one surface side of the substrate, and a second adhesive layer is formed on the other surface side of the substrate, the first adhesive layer and the second adhesive layer may be formed sequentially, and may be formed simultaneously. By forming the second adhesive layer after forming the first adhesive layer, the first adhesive layer may be further dried so that the peeling force of the first adhesive layer surface side of the foaming adhesive sheet may be higher than the peeling force of the second adhesive layer surface side.

B. Method for Producing Product

The method for producing a product in the present disclosure comprises: a placing step of placing the foaming adhesive sheet described above between a first member and a second member; and an adhering step of adhering the first member and the second member by foaming and curing the foaming adhesive sheet.

Figure 5A:
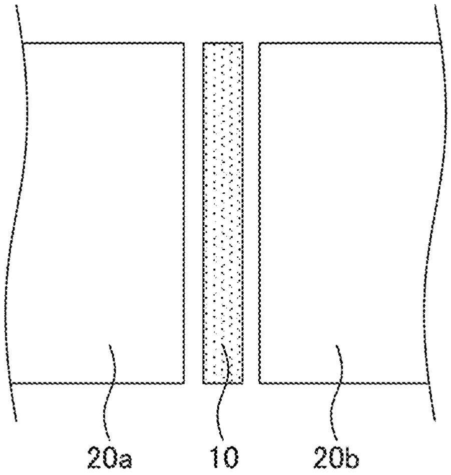
FIGS. 5A and 5B are schematic cross-sectional views illustrating an example of a method for producing a product in the present disclosure.
Figure 5B:
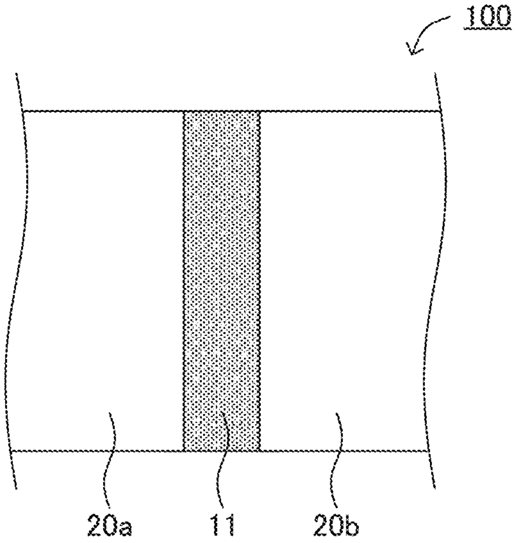

FIGS. 5A and 5B are process drawings illustrating an example of a method for producing a product in the present disclosure. Firstly, as shown in FIG. 5A, foaming adhesive sheet 10 is placed between first member 20*a* and second member 20*b*. Next, as shown in FIG. 5B, by heating, for example, the foaming adhesive sheet 10 is foamed and cured. The first member 20*a* and the second member 20*b* are adhered (joined) by adhesive sheet 11 after foamed and cured. Thereby, product 100 wherein the adhesive sheet 11 is placed between the first member 20*a* and the second member 20*b*, may be obtained.

In the method for producing a product in the present disclosure, since the foaming adhesive sheet described above is used, the close adhesiveness of the adhesive layer with respect to the substrate is excellent. Therefore, even when at least one of the first member and the second member has a burr, when inserting the foaming adhesive sheet into a gap of one member or into a gap between the two members, or when placing a foaming adhesive sheet on one member and then inserting the other member into a gap, lifting off or peeling off of the adhesive layer from the substrate may be suppressed. Also, when the foaming adhesive sheet is previously bent upon placing the foaming adhesive sheet between the first member and the second member, lifting off or peeling off of the adhesive layer from the substrate may be suppressed. Therefore, a product wherein the adhesiveness of the first member and the second member is excellent, may be obtained.

The method for producing a product in the present disclosure is hereinafter explained.

1. Foaming Adhesive Sheet

In the method for producing a product, as a foaming adhesive sheet, the foaming adhesive sheet described above, wherein an adhesive layer and a substrate is placed in this order, and a peeling force of a surface side where the adhesive layer is placed, measured by SAICAS method is 2.0 N or more, may be used. Also, as the foaming adhesive sheet, one including a first adhesive layer and a second adhesive layer as the adhesive layer, and the first adhesive layer, the substrate, and the second adhesive layer are placed in this order in the thickness direction, may be used. In this case, the peeling force of the foaming adhesive sheet, of at least one of the surface side where the first adhesive layer is placed, and the surface side where the second adhesive layer is placed, measured by SAICAS method may be 2.0 N or more.

Incidentally, the details of the foaming adhesive sheet are described in the section "A. Foaming adhesive sheet" above; thus, the description herein is omitted.

2. Placing Step

In the placing step in the present disclosure, a method for placing the foaming adhesive sheet between the first member and the second member is not particularly limited. Examples thereof may include a method wherein the foaming adhesive sheet is inserted into a gap between the first member and the second member; and a method wherein the foaming adhesive sheet is placed on the first member, and then, the second member is inserted into a gap after placing the foaming adhesive sheet on the first member.

3. Adhering Step

In the adhering step in the present disclosure, examples of a method for foaming and curing the foaming adhesive sheet may include a heating and a light irradiation. Among them, the foaming adhesive sheet is preferably foamed and cured by heating. The method by heating may be applied even when the first member and the second member are not transparent, such as a metal member.

The heating conditions are appropriately set according to, for example, the type of the curable adhesive and foaming agent included in the adhesive layer, and the type of the substrate. The heating temperature may be, for example, 130° C. or more, and 200° C. or less. Also, the heating time may be, for example, 3 minutes or more and 3 hours or less.

Incidentally, the present disclosure is not limited to the embodiments. The embodiments are exemplification, and any other variations are intended to be included in the technical scope of the present disclosure if they have substantially the same constitution as the technical idea described in the claim of the present disclosure and offer similar operation and effect thereto.

EXAMPLES

Example 1

Firstly, an adhesive composition having a composition (mass %) shown in Table 1 below was prepared. Also, details of each material shown in Table 1 are shown in Table 2.

Also, using a polyphenylene sulfide film (PPS film, Torelina 100-3A30 from Toray Industries, Inc., thickness: 100 μm) having high insulating property as a substrate, a corona treatment was carried out so as the surface tension was 70 dyne or more. The adhesive composition was applied to one surface of this substrate using an applicator so that a thickness after coating was 45 μm. Thereafter, it was dried for 3 minutes at 100° C. in an oven to form a first adhesive layer. Further, a second adhesive layer was formed, similarly as the first adhesive layer, on the other surface of the substrate. Thereby, a foaming adhesive sheet wherein the first adhesive layer and the second adhesive layer were respectively formed on both surfaces of the substrate, was obtained.

Example 2

A foaming adhesive sheet was produced in the same manner as in Example 1 except that a blast treatment was carried out to the substrate so as arithmetic average roughness Ra was 0.64 μm.

Comparative Example 1

A foaming adhesive sheet was produced in the same manner as in Example 1 except that an adhesive composition having a composition (mass %) shown in Table 1 below was used.

Example 3

A foaming adhesive sheet was produced in the same manner as in Example 1 except that an adhesive composition having a composition (mass %) shown in Table 1 below was used, and a polyphenylene sulfide film (PPS film, thickness: 100 μm, arithmetic average roughness Ra was 0.64 μm) having high insulating property, wherein a blast treatment as similar to Example 2 was carried out, was used as a substrate.

Example 4

As a substrate, a polyphenylene sulfide film (PPS film, thickness: 100 μm) having high insulating property as similar to Example 1 was prepared. Also, with respect to 100 mass parts of a mixture of polyester and polyvinyl chloride, a curing agent (polyisocyanate) was compounded at the proportion of 2 mass parts, further diluted with methyl ethyl ketone (MEK) so that the solid content was 15 mass % to prepare a resin composition. The resin composition was applied to one surface of the substrate by a bar coater, dried for 3 minutes at 120° C. in an oven to form a first intermediate layer having thickness of 2 μm. Further, a second intermediate layer was formed, similarly as the first intermediate layer, on the other surface of the substrate.

Next, using the adhesive composition similar to Example 3, a first adhesive layer and a second adhesive layer were formed by the method similar to Example 1, on the first intermediate layer and the second intermediate layer respectively. Thereby, obtained a foaming adhesive sheet wherein the first adhesive layer, the first intermediate layer, the substrate, the second intermediate layer, and the second adhesive layer were placed in this order.

Comparative Example 2

A foaming adhesive sheet was produced in the same manner as in Comparative Example 1 except that, using a polyethylene naphthalate film (PEN film, TeonexQ51-100 from Toyobo Film Solution Ltd., thickness: 100 μm) having high insulating property as a substrate, a corona treatment was carried out so as the surface tension was 70 dyne or more.

Example 5

A foaming adhesive sheet was produced in the same manner as in Example 1 except that an adhesive composition similar to Example 3 was used, and a polyethylene naphthalate film (PEN film, thickness: 100 μm) having high insulating property similar to Comparative Example 2 wherein a blast treatment was carried out so as arithmetic average roughness Ra was 0.77 μm, was used as a substrate.

Example 6

A foaming adhesive sheet was produced in the same manner as in Example 4 except that a polyethylene naphthalate film (PEN film, thickness: 100 μm) having high insulating property similar to Comparative Example 2 was used as a substrate.

Comparative Example 3

A foaming adhesive sheet was produced in the same manner as in Example 1 except that an adhesive composition having a composition (mass %) shown in Table 1 below was used.

Example 7

A foaming adhesive sheet was produced in the same manner as in Example 2 except that an adhesive composition having a composition (mass %) shown in Table 1 below was used.

Example 8

As a substrate, a polyphenylene sulfide film (PPS film, Torelina 115-3F00 from Toray Industries, Inc., thickness: 115 μm) having high insulating property was used. Also, with respect to 100 mass parts of a polyester polymer, a curing agent (polyisocyanate) was compounded at the proportion of 15 mass parts, and a catalyst (trisdimethylaminomethyl phenol) was compounded at the proportion of 0.3 mass parts, further diluted with methyl ethyl ketone (MEK) so that the solid content was 15 mass, to prepare a resin composition. The resin composition was applied to one surface of the substrate by a bar coater, dried for 1 minutes at 100° C. in an oven to form a first intermediate layer having thickness of 2 μm. Further, a second intermediate layer was formed, similarly as the first intermediate layer, on the other surface of the substrate.

Next, the adhesive composition having a composition (mass %) shown in Table 1 below was applied on the surface of the first intermediate layer, that is opposite to the substrate, using an applicator so that a thickness after coating was 38 μm. Thereafter, it was dried for 3 minutes at 100° C. in an oven to form a first adhesive layer. Further, a second adhesive layer was formed, similarly as the first adhesive layer, on the surface of the second intermediate layer that is opposite to the substrate. Thereby, obtained a foaming adhesive sheet wherein the first adhesive layer, the first intermediate layer, the substrate, the second intermediate layer, and the second adhesive layer were placed in this order.

Example 9

A foaming adhesive sheet was produced in the same manner as in Example 8 except that the adhesive composition having a composition (mass %) shown in Table 1 below was used.

[Evaluation 1]

(Peeling Force)

The peeling force of the surface side where the first adhesive layer was placed, and the peeling force of the surface side where the second adhesive layer was placed, of a foaming adhesive sheet were respectively measured using a surface-interface cutting tester. Firstly, the foaming adhesive sheet was cut out to 5 cm×5 cm, this foaming adhesive sheet was fixed on a vacuum holder, and the adhesive layer was cut by a cutting knife. Specifically, firstly, the adhesive layer was cut obliquely by the cutting knife from one surface of the foaming adhesive sheet. Then, at the point where the force applied to the cutting knife changed greatly, and the horizontal force applied to the cutting knife decreased for the first time, the cutting was carried out by moving the cutting knife relative to the foaming adhesive sheet only in the horizontal direction. Then, the horizontal force applied to the cutting knife, during the cutting was measured. The horizontal force applied to the cutting knife, when the cutting knife was cutting only in the horizontal direction with respect to the foaming adhesive sheet, corresponds to the peeling force. The measurement of the peeling force was carried out to the first adhesive layer side surface, and the second adhesive layer side surface of the foaming adhesive sheet respectively. As the surface-interface cutting tester, SAICAS DN-GS type from Daipla Wintes co., LTD. was used. As the cutting knife, Borazon alloy knife with knife width of 1.0 mm, rake angle of 20°, clearance angle of 10° was used. Also, the measurement conditions were as follows.

Measurement mode: constant rate mode

Horizontal rate: 2 μm/sec

Vertical rate: 0.1 μm/sec

Temperature: 23° C.

(L-Shaped Bending Test)

The foaming adhesive sheet was cut out to 3 cm×3 cm, and this foaming adhesive sheet was bent by 90° in half so as the surface wherein the adhesive layer to be tested was placed faced inside, and to be the size of 3 cm×1.5 cm. Then, whether the adhesive layer was lifted from the substrate or not was checked. The close adhesiveness by the L-shaped bending test was evaluated based on the following standards.

A: there was no lift in the bent portion

B: there was a lift in the bent portion (Cross-Shaped Bending Test)

The foaming adhesive sheet was cut out to 3 cm×3 cm, and this foaming adhesive sheet was bent by 180° in half so as the surface wherein the adhesive layer to be tested was placed faced inside, and to be the size of 3 cm×1.5 cm. Subsequently, the foaming adhesive sheet in this condition was further bent by 180° in half so as to be the size of 1.5 cm×1.5 cm. Then, whether the adhesive layer was lifted from the substrate or not was checked. The close adhesiveness by the cross-shaped bending test was evaluated based on the following standards.

A: there was no lift in the bent portion

B: there was a lift in the bent portion (Cutter Cutting Test)

The surface of the foaming adhesive sheet wherein the adhesive layer to be tested was placed was cut in the length of 100 mm at rate of 20 mm/s or more and 100 mm/s or less with a cutter (Cutter knife A plus from Olfa Corporation), and whether the adhesive layer was lifted from the substrate or not in the cut surface was checked. The close adhesiveness by the cutter cutting test was evaluated based on the following standards.

A: there was no lift in the cut surface at all

B: there was a few lifts in the cut surface

C: there was a complete lift in the cut surface (Pressure-Sensitive Adhesive Force)

The foaming adhesive sheet was cut into the width of 24 mm and the length of 300 mm, and the surface of one adhesive layer of this foaming adhesive sheet was adhered on a stainless plate (SUS304) using a manual roller. Then, the pressure-sensitive adhesive force (N/25 mm) with respect to the stainless plate surface was measured, using a tensile tester (Tensilon RTF1150 from A & D Company Limited), under conditions (pulling rate: 300 mm/min, peeling distance: 150 mm, peeling angle: 180°) according to JIS Z0237: 2009 (testing method for a pressure-sensitive adhesive tape and pressure-sensitive adhesive sheet) and testing method of a pressure-sensitive adhesive force 1 (temperature of 23° C., humidity of 50%, a test method wherein a tape and a sheet is peeled off by 180° with respect to a stainless test plate) prepared based on ISO 29862.

TABLE 1

| | | Ex. 1 | Ex. 2 | Comp.Ex.1 | Ex. 3 | Ex. 4 | Comp.Ex.2 | Ex. 5 | Ex. 6 | Comp.Ex.3 | Ex. 7 | Ex. 8 | Ex. 9 |
|---|---|---|---|---|---|---|---|---|---|---|---|---|---|
| Adhesive composition | Acrylic resin | 13 | 13 | 13 | 13 | 13 | 13 | 13 | 13 | 13 | 13 | 13 | 13 |
| | Epoxy resin A1 | 5 | 5 | 5 | — | — | 5 | — | — | — | — | — | — |
| | Epoxy resin A2 | 30 | 30 | 20 | 40 | 40 | 20 | 40 | 40 | 40 | 40 | 40 | 40 |
| | Epoxy resin B | 52 | 52 | 62 | 42 | 42 | 62 | 42 | 42 | 42 | 42 | 42 | 42 |
| | Curing agent 1 | — | — | 6 | 6 | 6 | 6 | 6 | 6 | 6 | 6 | 6 | 6 |
| | Curing agent 2 | 3 | 3 | 3.2 | 3 | 3 | 3.2 | 3 | 3 | 8 | 8 | 8 | 8 |
| | Curing agent 3 | — | — | — | — | — | — | — | — | 3.3 | 3.3 | 3.3 | 3.3 |
| | Thermal foaming agent | 9 | 9 | 9.6 | 9.2 | 9.2 | 9.6 | 9.2 | 9.2 | 9.5 | 9.5 | 9.5 | 9.5 |
| | Solvent | 208 | 208 | 145 | 138 | 138 | 145 | 138 | 138 | 149 | 149 | 149 | 149 |
| | Solid conc. [mass %] | 35 | 35 | 45 | 45 | 45 | 45 | 45 | 45 | 45 | 45 | 45 | 45 |
| Substrate | | PPS | PPS | PPS | PPS | PPS | PEN | PEN | PEN | PPS | PPS | PPS | PEN |
| Surf treatment of substrate | | Corona | Blast | Corona | Blast | — | Corona | Blast | — | Corona | Blast | — | — |
| Intermediate layer | | No | No | No | No | Yes | No | No | Yes | No | No | Yes | Yes |
| Peeling force of 1st adhesive layer surface side [N] | | 3.8 | 4.1 | 1.6 | 3.6 | 3.8 | 1.7 | 4.2 | 3.8 | 0.6 | 4.1 | 4.1 | 4.3 |
| Peeling force of 2nd adhesive layer surface side [N] | | 3.6 | 3.8 | 1.4 | 3.4 | 3.6 | 1.5 | 3.8 | 3.8 | 0.4 | 3.8 | 3.7 | 2.5 |
| L-shaped bending test | | A | A | B | A | A | B | A | A | B | A | A | A |
| Cross shaped bending test | | A | A | B | A | A | B | A | A | B | A | A | A |
| Cutter cutting test | | C | B | C | B | A | C | B | A | C | B | A | A |
| Pressure-sensitive adhesive force[N/25 mm] | | 0 | 0 | 0 | 0 | 0 | 0 | 0 | 0 | 0 | 0 | 0 | 0 |

TABLE 2

| | |
|---|---|
| Acrylic resin | PMMA-PBuA-PMMA (partially acrylamide group) Tg: −20° C., 120° C., Mw: 150,000 |
| Epoxy resin A1 (First epoxy resin) | Bisphenol A type, solid at ordinary temperature Softening temperature: 64° C., epoxy equivalent: 450 g/eq, Mw: 900 melt viscosity at 150° C.: 1.2 Pa · s |
| Epoxy resin A2 (First epoxy resin) | Bisphenol A novolac type, solid at ordinary temperature Softening temperature: 70° C., epoxy equivalent: 210 g/eq. Mw: 1300 melt viscosity at 150° C.: 0.5 Pa · s |
| Epoxy resin B (Second epoxy resin) | BPA phenoxy type, solid at ordinary temperature Softening temperature: 110° C., epoxy equivalent: 8000 g/eq, Mw: 50,000 |
| Curing agent 1 | α-(hydroxy(or dihydroxy)phenylmethyl)-ω-hydropoly[biphenyl-4,4'-diylmethylene(hydroxy(or dihydroxy)phenylenemethylene)] |
| Curing agent 2 | 2-phenyl-4,5-dihydroxymethylimidazole average particle size: 3 μm, melting point: 230° C., reaction start temperature: 145° C.-155° C., active region: 155° C.-173° C. (2PHZ-PW from Shikoku Chemicals Corporation) |
| Curing agent 3 | Dicyandiamide particle size: 10 μm or less, melting point: 209° C. (DYHARD100SH from Evonik Degussa Industries) |
| Thermal foaming agent | Thermal expansion microcapsule, average particle size: 14-20 μm expansion start temperature: 120° C.-130° C., maximum expansion temperature: 160° C.-170° C. core: hydrocarbon, shell: acrylonitrile copolymer |
| Solvent | Methyl ethyl ketone |

As shown in Table 1, both the close adhesiveness in the L-shaped bending test and the close adhesiveness in the cross-shaped bending test were excellent in Examples 1 to 9. Also, since the substrate was subjected to the blast treatment in Examples 2, 3, 5, and 7, the close adhesiveness in the cutter cutting test was also excellent. Further, since the intermediate layer was place between the substrate and the adhesive layer in Examples 4, 6, 8, and 9, the close adhesiveness in the cutter cutting test was excellent. In contrast to this, since the peeling force measured by SAICAS method was low in Comparative Examples 1 to 3, both the close adhesiveness in the L-shaped bending test and the close adhesiveness in the cross-shaped bending test were inferior. Incidentally, the test results of the first adhesive layer surface side and the test results of the second adhesive layer surface side of the foaming adhesive sheet were the same.

Examples 10 to 23

Firstly, an adhesive composition having a composition (mass %) shown in Table 3 below was prepared. The details of each material other than the foaming agent shown in Table 3 are shown in Table 2. As the foaming agent, the following thermal foaming agents 1 to 8 were used.

- Thermal foaming agent 1: thermal expansion microcapsule, average particle size of 7 μm, expansion start temperature of 120° C. to 145° C., maximum expansion temperature of 155° C. to 175° C., core: hydrocarbon, shell: thermoplastic polymer
- Thermal foaming agent 2: thermal expansion microcapsule, average particle size of 13 μm, expansion start temperature of 123° C. to 133° C., maximum expansion temperature of 168° C. to 178° C., core: hydrocarbon, shell: thermoplastic polymer
- Thermal foaming agent 3: thermal expansion microcapsule, average particle size of 17 μm, expansion start temperature of 120° C. to 130° C., maximum expansion temperature of 160° C. to 170° C., core: hydrocarbon, shell: acrylonitrile copolymer
- Thermal foaming agent 4: thermal expansion microcapsule, average particle size of 20 μm, expansion start temperature of 115° C. to 125° C., maximum expansion temperature of 155° C. to 165° C., core: hydrocarbon, shell: thermoplastic polymer
- Thermal foaming agent 5: thermal expansion microcapsule, average particle size of 21 μm, expansion start temperature of 130° C. to 140° C., maximum expansion temperature of 160° C. to 170° C., core: hydrocarbon, shell: acrylonitrile copolymer
- Thermal foaming agent 6: thermal expansion microcapsule, average particle size of 25 μm, expansion start temperature of 125° C. to 135° C., maximum expansion temperature of 165° C. to 180° C., core: hydrocarbon, shell: thermoplastic polymer
- Thermal foaming agent 7: thermal expansion microcapsule, average particle size of 30 μm, expansion start temperature of 120° C. to 130° C., maximum expansion temperature of 160° C. to 170° C., core: hydrocarbon, shell: acrylonitrile copolymer
- Thermal foaming agent 8: thermal expansion microcapsule, average particle size of 41 μm, expansion start temperature of 115° C. to 125° C., maximum expansion temperature of 165° C. to 175° C., core: hydrocarbon, shell: acrylonitrile copolymer As a substrate, a polyphenylene sulfide film (PPS film, Torelina 115-3F00 from Toray Industries, Inc., thickness: 115 μm) having high insulating property was used. Also, with respect to 100 mass parts of a polyester polymer, a curing agent (polyisocyanate) was compounded at the proportion of 15 mass parts, and a catalyst (trisdimethylaminomethyl phenol) was compounded at the proportion of 0.3 mass parts, further diluted with methyl ethyl ketone (MEK) so that the solid content was 15 mass, to prepare a resin composition. The resin composition was applied to one surface of the substrate by a bar coater, dried for 1 minutes at 100° C. in an oven to form a first intermediate layer having thickness of 2 μm. Further, a second intermediate layer was formed, similarly as the first intermediate layer, on the other surface of the substrate.

Next, the adhesive composition described above was applied on the surface of the first intermediate layer, that is opposite to the substrate, using an applicator so that a thickness after coating was 38 μm. Thereafter, it was dried for 3 minutes at 100° C. in an oven to form a first adhesive layer. Further, a second adhesive layer was formed, similarly as the first adhesive layer, on the surface of the second intermediate layer that is opposite to the substrate. Thereby, obtaining a foaming adhesive sheet wherein the first adhesive layer, the first intermediate layer, the substrate, the second intermediate layer, and the second adhesive layer were placed in this order.

Reference Example

An adhesive sheet not including a foaming agent was produced. Specifically, an adhesive sheet was produced in the same manner as in Example 10 except that the adhesive composition having a composition (mass %) shown in Table 3 below was used.

[Evaluation 2]

(Peeling Force)

As similar to Example 1, the peeling force of the surface side where the first adhesive layer was placed, and the peeling force of the surface side where the second adhesive layer was placed, of the foaming adhesive sheet, were respectively measured.

(L-Shaped Bending Test)

As similar to Example 1, the close adhesiveness was evaluated by the L-shaped bending test.

(Cross-Shaped Bending Test)

As similar to Example 1, the close adhesiveness was evaluated by the cross-shaped bending test.

(Cutter Cutting Test)

As similar to Example 1, the close adhesiveness was evaluated by the cutter cutting test.

(Pressure-Sensitive Adhesive Force)

As similar to Example 1, the pressure-sensitive adhesive force was measured.

(Friction Coefficient)

The dynamic friction coefficient and the static friction coefficient between the surface of the foaming adhesive sheet where the adhesive layer to be tested is placed, and the metal plate were measured according to JIS K7125 corresponding to ISO 8295. Firstly, the foaming adhesive sheet was cut out to 80 mm×200 mm. Then, the foaming adhesive sheet was left to stand on a rectangular metal plate left to stand horizontally, a sliding peace (63 mm×63 mm, weight of 200 g, bottom surface: felt) was placed on the surface of the foaming adhesive sheet where the adhesive layer to be tested was placed, and the friction force was measured under conditions of testing rate of 100 mm/min, testing length of 50 mm, load cell of 10 N, and temperature of 23° C., and the dynamic friction coefficient and the static friction coefficient were calculated. As the device, a friction force measuring device FRICTION TESTER TR-2 from Toyo Seiki Seisaku-sho, Ltd. was used. Also, the material of the stainless steel plate used as a metal plate was SUS304, and the surface roughness Ra was 0.05 μm.

(Pencil Hardness)

A foaming adhesive sheet of A4 size was prepared, and set on a glass plate. The pencil hardness of the surface of the foaming adhesive sheet where the adhesive layer to be tested was placed, was measured according to JIS K5600 corresponding to ISO 15184, using a pencil hardness tester (with a level). The measurement conditions were angle from the horizontal state of a pencil of 45°, load of 750 g, testing rate of 1 mm/sec, testing length of 20 mm, and temperature of 23° C. Then, the highest hardness of the pencil with which the foaming adhesive sheet was not bruised by visual inspection was regarded as the pencil hardness. As the pencil hardness tester KT-VF2378-12 from Therminport Quality Control B.V. was used.

(Inserting Load)

Two sheets of the foaming adhesive sheet cut to 5.5 cm×6.0 cm, a hollow cylinder 1 with outer diameter of 22 mm, thickness of 1.5 mm, and length of 60 mm, and a hollow cylinder 2 with outer diameter of 18 mm, thickness of 1.0 mm, and length of 80 mm were prepared. The two foaming adhesive sheets were placed inside the cylinder 1, stacked and rolled so that the both surfaces where the adhesive layers to be tested were placed, were facing inside. Then, the cylinder 2 was previously inserted for 1 mm into a gap inside the foaming adhesive sheets in the cylinder 1. Thereafter, a weight was placed on the cylinder 2, and the weight of the weight, when the cylinder 2 was completely inserted into the gap inside the foaming adhesive sheets in the cylinder 1, was measured. The weight of the weight at this time was regarded as an inserting weight. The lower the inserting weight, the better in the inserting property.

(Foaming Magnification)

The foaming adhesive sheet was cut out to 5 cm×5 cm, hung in a hot-air drying device in a longitudinal direction so as to be foamed and cured under conditions of 180° C. or 150° C. for 30 minutes, then, cooled at room temperature for 2 hours, thereby obtained an adhesive sheet after foamed and cured. Then, the thickness of the adhesive sheet after foamed and cured was measured using a thickness gauge by a method according to JIS Z0237. The foaming magnification was determined by the following formula.

Foaming magnification (times)={adhesive sheet thickness after foamed and cured−(substrate thickness+first intermediate layer thickness+second intermediate layer thickness)}/(total thickness of first adhesive layer and second adhesive layer of a forming adhesive sheet before foaming and curing)

(Adhesiveness)

Figure 6A:
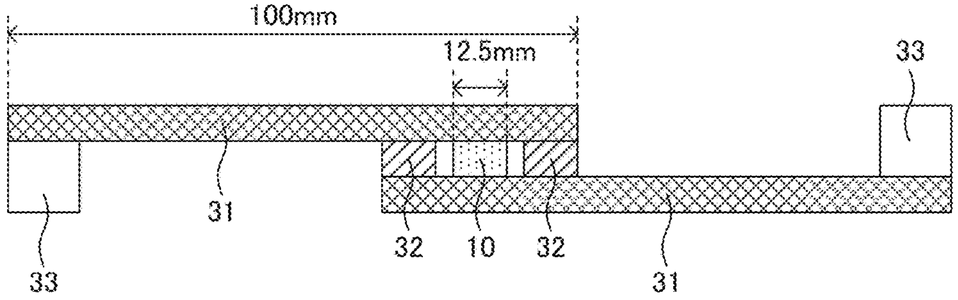
FIGS. 6A and 6B are schematic cross-sectional views explaining a testing method for an adhesiveness.
Figure 6B:
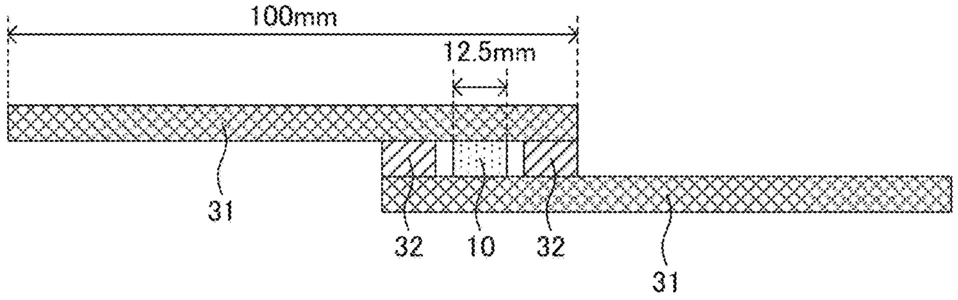

As shown in FIGS. 6A and 6B, two metal plates 31 (cold-rolled steel plate SPCC-SD) with thickness of 1.6 mm, width of 25 mm, length of 100 mm were prepared. Spacers 32 (kapton tapes) were placed with a predetermined interval on one tip end of one of the metal plates 31. The thickness of the spacers was approximately 280 μm or approximately 350 μm (thickness of 4 or 5 stacked Kapton tapes P-221 from Nitto Denko Corporation). The foaming adhesive sheet 10 cut out to 12.5 mm×25 mm was placed between the spacers 32, and the other metal plate 31 was placed so that one tip end overlapped.

For some test pieces, the test piece was obtained by placing supports 33, with the same thickness as the total thickness of the metal plate 31 and the spacer 32, on the other tip ends of the two metal plates 31 respectively. Then, the test piece was placed in a thermal pressing device, and the foaming adhesive sheet 10 was cured by heating under pressing load of 500 kgf at 150° C. for 8 minutes.

Also, the rest of them were fixed with clips to obtain a test piece. Then, the test piece was placed in a hot oven, heated at 180° C. for 30 minutes, and the foaming adhesive sheet 10 was cured.

Then, the shear strength (adhesive strength) of the heated test piece was measured by a tensil tester Tensilon RTF1350 (from A & D Company, Ltd.) according to JIS K6850 corresponding ISO 4587. The measurement conditions were tensile speed of 10 mm/min, and temperature of 200° C.

TABLE 3

| | | Ref. Ex. | Ex. 10 | Ex. 11 | Ex. 12 | Ex. 13 | Ex. 14 | Ex. 15 | Ex. 16 |
|---|---|---|---|---|---|---|---|---|---|
| Adhesive composition | Acrylic resin | 13 | 13 | 13 | 13 | 13 | 13 | 13 | 13 |
| | Epoxy resin A2 | 40 | 40 | 40 | 40 | 40 | 40 | 40 | 40 |
| | Epoxy resin B | 42 | 42 | 42 | 42 | 42 | 42 | 42 | 42 |
| | Curing agent 1 | 6 | 6 | 6 | 6 | 6 | 6 | 6 | 6 |
| | Curing agent 2 | 8 | 8 | 8 | 8 | 8 | 8 | 8 | 8 |
| | Curing agent 3 | 3.3 | 3.3 | 3.3 | 3.3 | 3.3 | 3.3 | 3.3 | 3.3 |
| | Thermal foaming agent 1 | — | 9.6 | 19.2 | — | — | — | — | — |
| | Thermal foaming agent 2 | — | — | — | 9.6 | 14.4 | 19.2 | — | — |

TABLE 3-continued

| | Ref. Ex. | Ex. 10 | Ex. 11 | Ex. 12 | Ex. 13 | Ex. 14 | Ex. 15 | Ex. 16 |
|---|---|---|---|---|---|---|---|---|
| Thermal foaming agent 3 | — | — | — | — | — | — | 9.6 | 12.8 |
| Thermal foaming agent 4 | — | — | — | — | — | — | — | — |
| Thermal foaming agent 5 | — | — | — | — | — | — | — | — |
| Thermal foaming agent 6 | — | — | — | — | — | — | — | — |
| Thermal foaming agent 7 | — | — | — | — | — | — | — | — |
| Thermal foaming agent 8 | — | — | — | — | — | — | — | — |
| Solvent | 137.3 | 149.0 | 160.7 | 149.0 | 154.9 | 160.7 | 149.0 | 152.9 |
| Solid conc. [mass %] | 45 | 45 | 45 | 45 | 45 | 45 | 45 | 45 |
| Substrate | PPS | PPS | PPS | PPS | PPS | PPS | PPS | PPS |
| Intermediate layer | Yes | Yes | Yes | Yes | Yes | Yes | Yes | Yes |
| Ave. particle size of foaming agent [μm] | — | 7 | 7 | 13 | 13 | 13 | 17 | 17 |
| Peeling force of 1st adhesive layer surface side [N] | | 4.3 | 4.3 | 3.9 | 4.3 | 4.2 | 4.1 | 4.2 |
| Peeling force of 2nd adhesive layer surface side [N] | | 3.8 | 3.5 | 3.7 | 4.0 | 4.0 | 3.7 | 4.2 |
| L-shaped bending test | | A | A | A | A | A | A | A |
| Cross shaped bending test | | A | A | A | A | A | A | A |
| Cutter cutting test | | A | A | A | A | A | A | A |
| Pressure-sensitive adhesive force [N/25 mm] | | 0 | 0 | 0 | 0 | 0 | 0 | 0 |
| Static friction coefficient | 0.36 | 0.34 | 0.29 | 0.33 | 0.29 | 0.28 | 0.25 | 0.25 |
| Dynamic friction coefficient | 0.31 | 0.26 | 0.23 | 0.24 | 0.22 | 0.21 | 0.22 | 0.22 |
| Pencil hardness | B | HB | HB | F | F | F | F | F |
| Inserting load [g] | 510 | 400 | | 430 | | | 320 | |
| Foaming magnification [times] heating cond.: 150° C. 30 min | 1.0 | 3.4 | 5.1 | 4.5 | 5.9 | 7.0 | 5.2 | 6.1 |
| Foaming magnification [times] heating cond.: 180° C. 30 min | 1.0 | | | | | | | |
| Adhesive strength [MPa] heating cond.: 150° C. 8 min GAP: about 280 μm, 200° C. | 0 | 1.05 | 1.21 | 0.83 | 0.95 | 0.96 | 0.90 | 0.74 |
| Adhesive strength [MPa] heating cond.: 150° C. 8 min GAP: about 350 μm, 200° C. | 0 | 0.47 | 0.51 | 0.64 | 0.75 | 0.67 | | |
| Adhesive strength [MPa] heating cond.: 180° C. 30 min GAP: about 280 μm, 200° C. | 0 | | | | | | | |

| | | Ex. 17 | Ex. 18 | Ex. 19 | Ex. 20 | Ex. 21 | Ex. 22 | Ex. 23 |
|---|---|---|---|---|---|---|---|---|
| Adhesive composition | Acrylic resin | 13 | 13 | 13 | 13 | 13 | 13 | 13 |
| | Epoxy resin A2 | 40 | 40 | 40 | 40 | 40 | 40 | 40 |
| | Epoxy resin B | 42 | 42 | 42 | 42 | 42 | 42 | 42 |
| | Curing agent 1 | 6 | 6 | 6 | 6 | 6 | 6 | 6 |
| | Curing agent 2 | 8 | 3 | 3 | 3 | 3 | 3 | 3 |
| | Curing agent 3 | 3.3 | — | — | — | — | — | — |
| | Thermal foaming agent 1 | — | — | — | — | — | — | — |
| | Thermal foaming agent 2 | — | — | — | — | — | — | — |
| | Thermal foaming agent 3 | 19.2 | 9.6 | — | — | — | — | — |
| | Thermal foaming agent 4 | — | — | 9.6 | — | — | — | — |
| | Thermal foaming agent 5 | — | — | — | 9.6 | — | — | — |
| | Thermal foaming agent 6 | — | — | — | — | 9.6 | — | — |
| | Thermal foaming agent 7 | — | — | — | — | — | 9.6 | — |
| | Thermal foaming agent 8 | — | — | — | — | — | — | 9.6 |
| | Solvent | 160.7 | 138.8 | 138.8 | 138.8 | 138.8 | 138.8 | 138.8 |
| | Solid conc. [mass %] | 45 | 45 | 45 | 45 | 45 | 45 | 45 |
| | Substrate | PPS | PPS | PPS | PPS | PPS | PPS | PPS |
| | Intermediate layer | Yes | Yes | Yes | Yes | Yes | Yes | Yes |
| | Ave. particle size of foaming agent [μm] | 17 | 17 | 20 | 21 | 25 | 30 | 41 |

TABLE 3-continued

| | Ref. Ex. | Ex. 10 | Ex. 11 | Ex. 12 | Ex. 13 | Ex. 14 | Ex. 15 | Ex. 16 |
|---|---|---|---|---|---|---|---|---|
| Peeling force of 1st adhesive layer surface side [N] | 4.3 | 3.8 | 3.8 | 4.4 | 3.6 | 3.9 | 3.8 | |
| Peeling force of 2nd adhesive layer surface side [N] | 3.8 | 3.6 | 3.4 | 4.3 | 3.2 | 3.6 | 3.7 | |
| L-shaped bending test | A | A | A | A | A | A | A | |
| Cross shaped bending test | A | A | A | A | A | A | A | |
| Cutter cutting test | A | A | A | A | A | A | A | |
| Pressure-sensitive adhesive force [N/25 mm] | 0 | 0 | 0 | 0 | 0 | 0 | 0 | |
| Static friction coefficient | 0.25 | 0.25 | 0.24 | 0.21 | 0.22 | 0.24 | 0.21 | |
| Dynamic friction coefficient | 0.23 | 0.22 | 0.20 | 0.19 | 0.19 | 0.19 | 0.18 | |
| Pencil hardness | F | F | F | F | F | F | H | |
| Inserting load [g] | | | | | | | | |
| Foaming magnification [times] heating cond.: 150° C. 30 min | 8.1 | | | | | | | |
| Foaming magnification [times] heating cond.: 180° C. 30 min | | 6.4 | 8.7 | 5.8 | 10.7 | 10.9 | 9.2 | |
| Adhesive strength [MPa] heating cond.: 150° C. 8 min GAP: about 280 μm, 200° C. | 0.57 | | | | | | | |
| Adhesive strength [MPa] heating cond.: 150° C. 8 min GAP: about 350 μm, 200° C. | | | | | | | | |
| Adhesive strength [MPa] heating cond.: 180° C. 30 min GAP: about 280 μm, 200° C. | | 0.67 | 0.68 | 0.58 | 0.35 | 0.33 | 0.27 | |

As shown in Table 3, since the intermediate layer was place between the substrate and the adhesive layer in Examples 10 to 23, both the close adhesiveness in the L-shaped bending test and the close adhesiveness in the cross-shaped bending test were excellent, and the close adhesiveness in the cutter cutting test was also excellent. Incidentally, the test result of the first adhesive layer surface side and the test result of the second adhesive layer surface side of the foaming adhesive sheet were the same.

Also, as shown in Table 3, as the average particle size of the foaming agent was larger, the static friction coefficient and the dynamic friction coefficient were lower, and the pencil hardness was higher. Also, in Example 15, as compared with Examples 10 and 12, the average particle size of the foaming agent was larger, the static friction coefficient and the dynamic friction coefficient were lower, the pencil hardness was higher, and the inserting load was lower. Also, in Example 15, as compared to Reference Example, the static friction coefficient and the dynamic friction coefficient were lower, and the pencil hardness was higher so that inserting load was lower. Thereby, it was suggested that, when the average particle size of the foaming agent was a predetermined value or more, the sliding property and the inserting property were improved. Also, it was suggested that the friction coefficient and the hardness of the adhesive layer side surface of the foaming adhesive sheet contributed to the inserting property. Incidentally, although Table 3 shows the evaluation results of the first adhesive layer surface side of the foaming adhesive sheet, the evaluation results of the first adhesive layer surface side and the evaluation results of the second adhesive layer surface side, of the foaming adhesive sheet were almost the same.

Also, as shown in Table 3, although the adhesive strength when the gap was approximately 280 μm in Examples 10 to 11 wherein the average particle size of the foaming agent was 7 μm, was excellent as more than 0.51 MPa, the adhesive strength when the gap was approximately 350 μm was decreased. Meanwhile, in Examples 12 to 20 wherein the average particle size of the foaming agent was 13 μm to 21 μm, the adhesive strength in both cases wherein the gap was approximately 280 μm, and wherein the gap was approximately 350 μm, were excellent as more than 0.51 MPa. Also, in Examples 21 to 23 wherein the average particle size of the foaming agent was 25 μm to 41 μm, the adhesive strength when the gap was approximately 280 μm was decreased. Thereby, it was suggested that, when the average particle size of the foaming agent was in a predetermined range, both of the adhesiveness when the gap between the members was relatively narrow, and the adhesiveness when the gap between the member was relatively wide, were improved.

REFERENCE SIGNS LIST

1: adhesive layer
2: substrate
3: intermediate layer
10: foaming adhesive sheet
11: adhesive sheet after foamed and cured
20*a*: first member
20*b*: second member
100: product

The invention claimed is:

1. A foaming adhesive sheet comprising a substrate and an adhesive layer placed on at least one surface side of the substrate; wherein: the adhesive layer is placed on an outermost surface; the adhesive layer includes a curable adhesive, and a foaming agent; a peeling force of a surface side where the adhesive layer is placed, measured by SAICAS (Surface And Interfacial Cutting Analysis System) method is 2.0 N or more; an intermediate layer is placed between the substrate and the adhesive layer; and the intermediate layer includes a cross-linked resin; or the intermediate layer includes a resin selected from a group consisting of: polyester, polyvinyl chloride, polyvinyl acetate, polyurethane, a polymer obtained by copolymerizing at least two or more of polyester, polyvinyl chloride, polyvinyl acetate, and polyurethane, a cross-linked material of at least two or more of polyester, polyvinyl chloride, polyvinyl acetate, polyurethane, and a polymer obtained by copolymerizing at least two or more of polyester, polyvinyl chloride, polyvinyl acetate, and polyurethane, and a combination thereof.

2. The foaming adhesive sheet according to claim 1, wherein an average thickness of the intermediate layer is 0.5 μm or more and 4 μm or less.

3. The foaming adhesive sheet according to claim 1, wherein a pressure-sensitive adhesive force of the adhesive layer is 0 N/25 mm or more and 0.1 N/25 mm or less.

4. The foaming adhesive sheet according to claim 1, wherein a pencil hardness of a surface of the foaming adhesive sheet on the adhesive layer side is F or more.

5. The foaming adhesive sheet according to claim 1, wherein a static friction coefficient of a surface of the foaming adhesive sheet on the adhesive layer side is 0.30 or less.

6. The foaming adhesive sheet according to claim 1, wherein an average particle size of the foaming agent is 10 μm or more and 24 μm or less.

7. The foaming adhesive sheet according to claim 6, wherein an average thickness of the adhesive layer is the average particle size of the foaming agent or more.

8. The foaming adhesive sheet according to claim 7, wherein an average thickness of the adhesive layer is 10 μm or more and 200 μm or less.

9. The foaming adhesive sheet according to claim 6, wherein a content of the foaming agent is 3 mass parts or more and 25 mass parts or less, when a resin component included in the adhesive layer is regarded as 100 mass parts.

10. The foaming adhesive sheet according to claim 6, wherein the adhesive layer is formable by a foaming magnification of 3.5 times or more and 9 times or less.

11. The foaming adhesive sheet according to claim 1, wherein a bending moment is 3 gf cm or more and less than 40 gf cm.

12. A method for producing a product, the method comprising:

a placing step of placing the foaming adhesive sheet according to claim 1 between a first member and a second member; and an adhering step of adhering the first member and the second member by foaming and curing the foaming adhesive sheet.

* * * * *